US010724612B2

(12) United States Patent
    Washio

(10) Patent No.: US 10,724,612 B2
(45) Date of Patent: Jul. 28, 2020

(54) CONTROL APPARATUS FOR VEHICLE

(71) Applicant: TOYOTA JIDOSHA KABUSHIKI KAISHA, Toyota-shi, Aichi-ken (JP)

(72) Inventor: Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/263,536

(22) Filed: Jan. 31, 2019

(65) Prior Publication Data
    US 2019/0249756 A1    Aug. 15, 2019

(30) Foreign Application Priority Data
    Feb. 13, 2018    (JP) .................. 2018-023550

(51) Int. Cl.
    *F16H 37/02*    (2006.01)
    *F16H 3/72*    (2006.01)
    *B60W 10/115*    (2012.01)
    *B60W 10/06*    (2006.01)

(52) U.S. Cl.
    CPC ........... F16H 3/728 (2013.01); B60W 10/115 (2013.01); B60W 10/06 (2013.01); B60W 2710/0666 (2013.01)

(58) Field of Classification Search
    CPC ...... F16H 37/02; F16H 37/022; F16H 37/027; F16H 2037/023; F16H 2037/026; F16H 2037/028; F16H 2059/683; F16H 59/72; F16H 2061/0087; F16H 2061/1232; F16H 2061/66286
    See application file for complete search history.

(56) References Cited

U.S. PATENT DOCUMENTS

| 6,855,085 | B1* | 2/2005 | Gumpoltsberger ... F16H 37/021 475/211 |
| 2009/0098969 | A1* | 4/2009 | Tabata .................... B60L 50/16 475/5 |
| 2012/0065022 | A1 | 3/2012 | Ohashi et al. |
| 2012/0270702 | A1 | 10/2012 | Ohashi et al. |

(Continued)

FOREIGN PATENT DOCUMENTS

| JP | 2005-140232 A | 6/2005 |
| JP | 2010-216625 A | 9/2010 |
| JP | 2017-007369 A | 1/2017 |

*Primary Examiner* — Edwin A Young
(74) *Attorney, Agent, or Firm* — Oliff PLC

(57) ABSTRACT

A control apparatus for a vehicle that includes a drive-force transmitting apparatus and a hydraulic control unit. The drive-force transmitting apparatus defines a first transmitting path that is to be established by engagements of a first engagement device and a dog clutch, and a second transmitting path that is to be established by engagement of a second engagement device. When a rate of supply of a working fluid to the hydraulic control unit will be insufficient if at least two of a first engaging operation for engaging the first friction engagement device; a second engaging operation for engaging the second friction engagement device; a third engaging operation for engaging the dog clutch; and a shifting operation for executing a shifting action in a transmission mechanism of the drive-force transmitting apparatus are executed in an overlapped manner, the control apparatus executes these operations in accordance with an order of priority.

12 Claims, 3 Drawing Sheets

(56) References Cited

U.S. PATENT DOCUMENTS

2016/0131256 A1* 5/2016 Toyoda ................ F16H 37/022
 701/51
2016/0368499 A1 12/2016 Kimura et al.

* cited by examiner

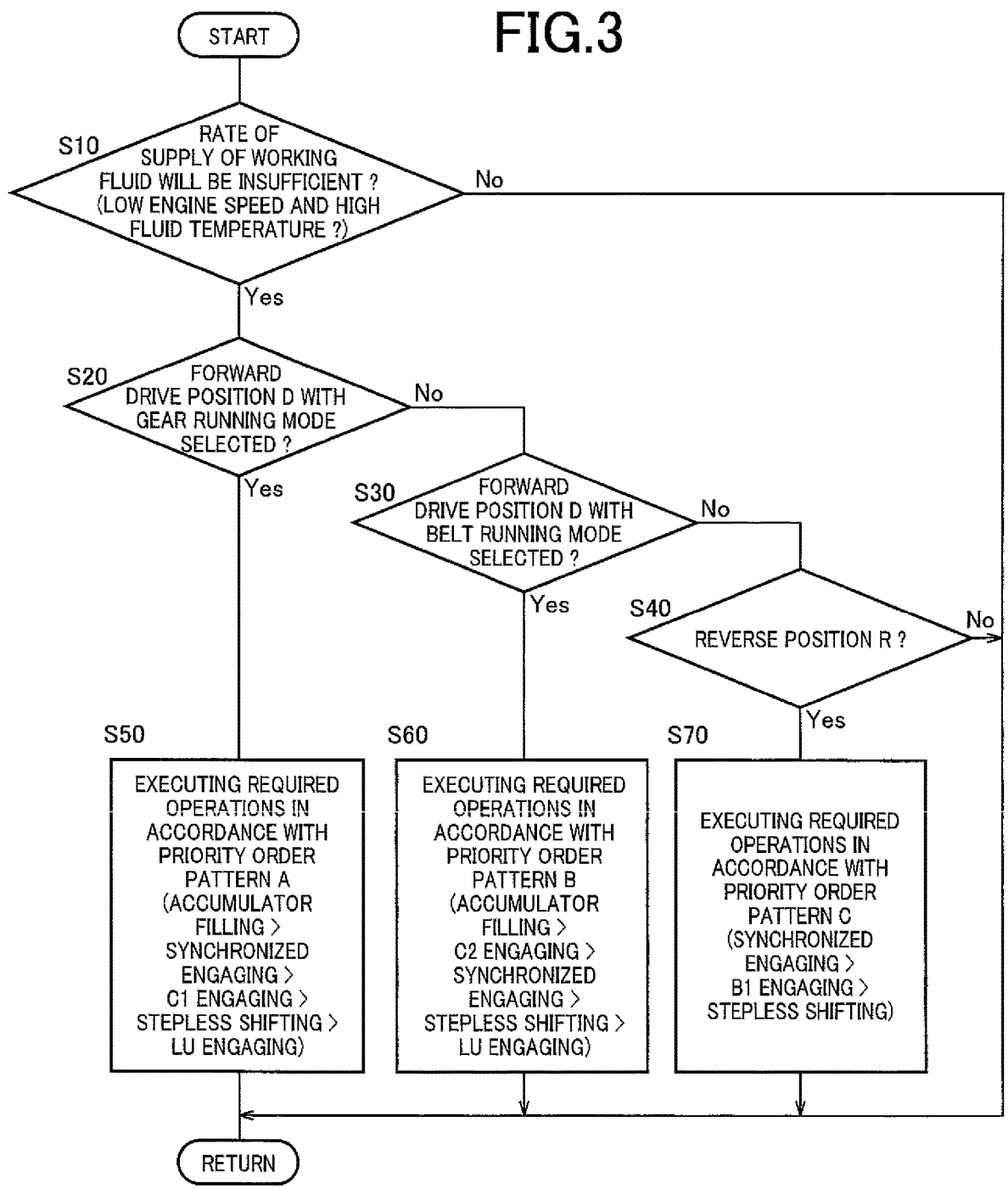

CONTROL APPARATUS FOR VEHICLE

This application claims priority from Japanese Patent Application No. 2018-023550 filed on Feb. 13, 2018, the disclosure of which is herein incorporated by reference in its entirety.

FIELD OF THE INVENTION

The present invention relates to a control apparatus for a vehicle having a plurality of drive-force transmitting paths that are provided in parallel with each other between a drive force source and drive wheels of the vehicle.

BACKGROUND OF THE INVENTION

There is known a control apparatus for a vehicle provided with a drive-force transmitting apparatus that includes: an input rotary member to which a drive force is to be transmitted from a drive force source of the vehicle; an output rotary member from which the drive force is to be outputted to drive wheels of the vehicle; a gear mechanism configured to provide at least one gear ratio; and a continuously-variable transmission mechanism including a primary pulley, a secondary pulley and a transfer element, wherein the drive-force transmitting apparatus defines a plurality of drive-force transmitting paths that are provided in parallel with each other between the input rotary member and the output rotary member, and the plurality of drive-force transmitting paths include a first drive-force transmitting path through which the drive force is to be transmitted by the gear mechanism when the first drive-force transmitting path is established by engagements of a first friction engagement device and a dog clutch, and a second drive-force transmitting path through which the drive force is to be transmitted by the continuously-variable transmission mechanism when the second drive-force transmitting path is established by engagement of a second friction engagement device. As an example of such a control apparatus, JP-2017-7369A discloses a control apparatus for a vehicle. This Japanese Patent Application Publication discloses a hydraulic control unit provided in the vehicle that is equipped with a drive-force transmitting apparatus defining first and second drive-force transmitting paths provided in parallel with each other, wherein the hydraulic control unit includes a plurality of solenoid valves configured to output respective hydraulic pressures by using a working fluid supplied from a pump, such that the first and second friction engagement devices, dog clutch and primary and secondary pulleys are operated by the outputted hydraulic pressures.

SUMMARY OF THE INVENTION

By the way, when the plurality of solenoid valves are operated such that hydraulic operations (such as an engaging operation for switching the engagement device from its released state to its engaged state and a stepless shifting operation for executing a shifting action in the continuously-variable transmission mechanism), each of which requires a certain rate of consumption of the working fluid, are executed in an overlapped manner, there is a case in which a required rate of supply of the working fluid, which is required for the execution of the hydraulic operations, is not available, namely, a flow rate of the supplied working fluid is insufficient for the execution of the hydraulic operations. If the flow rate of the supplied working fluid is not sufficient, there is a risk that a slippage of the transfer element, an engagement failure of the dog clutch and other failures could occur. Such a phenomenon of the insufficient flow rate of the supplied working fluid easily happens, for example, when a flow rate of the working fluid supplied from the pump is reduced by reduction of a rotational speed of the drive force source (by which the pump is driven), or when a temperature of the working fluid is made so high that a leakage amount of the working fluid is increased in the hydraulic control unit. The above-described engagement failure of the dog clutch means, for example, an undesirable release of the dog clutch when the dog clutch should be held in the engaged state or an unsmooth meshing of teeth of the dog clutch when the dog clutch is switched from the released state to the engaged state.

The present invention was made in view of the background art described above. It is therefore an object of the present invention to provide a control apparatus for a vehicle, which is capable of reducing failures that affect running of the vehicle, when a rate of supply of the working fluid to the hydraulic control unit is to be insufficient relative to a rate of consumption of the working fluid in the hydraulic control unit.

The object indicated above is achieved according to the following aspects of the present invention.

According to a first aspect of the invention, there is provided a control apparatus for a vehicle that includes a drive force source, drive wheels, a drive-force transmitting apparatus, a hydraulic control unit and a pump. The drive-force transmitting apparatus includes: (i) an input rotary member to which a drive force is to be transmitted from the drive force source; (ii) an output rotary member from which the drive force is to be outputted to the drive wheels; (iii) a gear mechanism configured to provide at least one gear ratio; (iv) a continuously-variable transmission mechanism including a primary pulley, a secondary pulley and a transfer element looped over the primary and secondary pulleys; (v) a first friction engagement device; (vi) a second friction engagement device; and (vii) a dog clutch. The drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism when the first drive-force transmitting path is established by engagements of the first friction engagement device and the dog clutch, wherein the plurality of drive-force transmitting paths include a second drive-force transmitting path through which the drive force is to be transmitted by the continuously-variable transmission mechanism when the second drive-force transmitting path is established by engagement of the second friction engagement device. The hydraulic control unit includes (viii) a plurality of solenoid valves configured to output respective hydraulic pressures by using a working fluid that is supplied to the hydraulic control unit, wherein the plurality of solenoid valves include: a first solenoid valve configured to regulate a first hydraulic pressure by which the first friction engagement device is to be operated; a second solenoid valve configured to regulate a second hydraulic pressure by which the second friction engagement device is to be operated; a third solenoid valve configured to regulate a third hydraulic pressure by which the dog clutch is to be operated; a fourth solenoid valve configured to regulate a fourth hydraulic pressure by which the primary pulley is to be operated; and a fifth solenoid valve configured to regulate a fifth hydraulic pressure by which the secondary pulley is to be operated. The pump is configured to supply the working fluid to the hydraulic control unit. The vehicle is to run with a selected one of first and second running modes being established, such that the vehicle runs by the drive force transmitted through the first drive-force transmitting path when the first running mode is established, and such that the vehicle runs by the drive force transmitted through the second drive-force transmitting path when the second running mode is established. The control apparatus comprises a transmission shifting control portion that is configured, when a rate of supply of the working fluid to the hydraulic control unit is to be insufficient relative to a rate of consumption of the working fluid in the hydraulic control unit if at least two of a plurality of hydraulic operations are executed in an overlapped manner, to execute required ones of the plurality of hydraulic operations in accordance with an order of priority that is dependent on, for example, the selected one of first and second running modes, wherein the plurality of hydraulic operations include: a first engaging operation that is executed to switch the first friction engagement device from a released state to an engaged state; a second engaging operation that is executed to switch the second friction engagement device from a released state to an engaged state; a third engaging operation that is executed to switch the dog clutch from a released state to an engaged state; and a stepless shifting operation that is executed to operate at least one of the first and second pulleys. The control apparatus may further comprises a state determining portion that is configured to determine whether the rate of supply of the working fluid to the hydraulic control unit is to be insufficient relative to the rate of consumption of the working fluid in the hydraulic control unit if at least two of the plurality of hydraulic operations are executed in the overlapped manner, wherein the pump is to be driven by rotation of the drive force source, and wherein the state determining portion is configured to determine that the rate of supply of the working fluid to the hydraulic control unit is to be insufficient relative to the rate of consumption of the working fluid in the hydraulic control unit if at least two of the plurality of hydraulic operations are executed in the overlapped manner, when a speed of the rotation of the drive force source is not higher than a predetermined speed value and/or a temperature of the working fluid is not lower than a predetermined temperature degree.

According to a second aspect of the invention, in the control apparatus according to the first aspect of the invention, when the second and third engaging operations are to be executed as the required ones of the plurality of hydraulic operations, the transmission shifting control portion is configured to set the order of priority to a priority order pattern by which a higher priority is given to execution of the second engaging operation than to execution of the third engaging operation, and when the first and third engaging operations are to be executed as the required ones of the plurality of hydraulic operations, the transmission shifting control portion is configured to set the order of priority to a priority order pattern by which a higher priority is given to execution of the third engaging operation than to execution of the first engaging operation.

According to a third aspect of the invention, in the control apparatus according to the first or second aspect of the invention, when the first engaging operation and the stepless shifting operation are to be executed as the required ones of the plurality of hydraulic operations, the transmission shifting control portion is configured to set the order of priority to a priority order pattern by which a higher priority is given to execution of the first engaging operation than to execution of the stepless shifting operation, and when the second engaging operation and the stepless shifting operation are to be executed as the required ones of the plurality of hydraulic operations, the transmission shifting control portion is configured to set the order of priority to a priority order pattern by which a higher priority is given to execution of the second engaging operation than to execution of the stepless shifting operation.

According to a fourth aspect of the invention, in the control apparatus according to any one of the first through third aspects of the invention, the hydraulic control unit further includes a switching valve that is configured to switch a fluid passage defined in the switching valve, in association with a switching operation made through a shifting member by an operator of the vehicle, such that a forward hydraulic pressure is outputted from the switching valve when the shifting member is placed into a forward-drive operation position, wherein the hydraulic control unit further includes an accumulator that is connected to a fluid passage through which the forward hydraulic pressure outputted from the switching valve is to flow, wherein the plurality of hydraulic operations further include an accumulator filling operation that is executed to fill the accumulator, and wherein, when the accumulator filling operation and at least one of the plurality of hydraulic operations, which is other than the accumulator filling operation, are to be executed as the required ones of the plurality of hydraulic operations, with the shifting member being placed in the forward-drive operation position, the transmission shifting control portion is configured to set the order of priority to a priority order pattern by which a higher priority is given to execution of the accumulator filling operation than to execution of any one of the at least one of the plurality of hydraulic operations.

According to a fifth aspect of the invention, in the control apparatus according to the fourth aspect of the invention, when the third engaging operation and the stepless shifting operation in addition to the accumulator filling operation are to be executed as the required ones of the plurality of hydraulic operations, with the shifting member being placed in the forward-drive operation position, the transmission shifting control portion is configured, after execution of the accumulator filling operation has been completed, to execute the third engaging operation and then the stepless shifting operation in accordance with the priority order pattern.

According to a sixth aspect of the invention, in the control apparatus according to the fifth aspect of the invention, when the first engaging operation in addition to the accumulator filling operation, the third engaging operation and the stepless shifting operation is to be executed as one of the required ones of the plurality of hydraulic operations, with the shifting member being placed in the forward-drive operation position, and with the first running mode being selected, the transmission shifting control portion is configured, after execution of the accumulator filling operation has been completed, to execute the first engaging operation, the third engaging operation and the stepless shifting operation in accordance with the priority order pattern, such that the third engaging operation, the first engaging operation and the stepless shifting operation are executed in this order.

According to a seventh aspect of the invention, in the control apparatus according to the fifth or sixth aspect of the invention, when the second engaging operation in addition to the accumulator filling operation, the third engaging operation and the stepless shifting operation is to be executed as one of the required ones of the plurality of hydraulic operations, with the shifting member being placed in the forward-drive operation position, and with the second running mode being selected, the transmission shifting control portion is configured, after execution of the accumulator filling operation has been completed, to execute the second engaging operation, the third engaging operation and the stepless shifting operation in accordance with the priority order pattern, such that the second engaging operation, the third engaging operation and the stepless shifting operation are executed in this order.

According to an eighth aspect of the invention, in the control apparatus according to any one of the first through seventh aspects of the invention, the drive-force transmitting apparatus further includes a third friction engagement device, wherein the first drive-force transmitting path is to be established by engagements of the third engagement device and the dog clutch as well as by the engagements of the first friction engagement device and the dog clutch, such that the first drive-force transmitting path serves as a forward-driving first drive-force transmitting path for enabling the vehicle to run in a forward direction when being established by the engagements of the first friction engagement device and the dog clutch, and such that the first drive-force transmitting path serves as a reverse-driving first drive-force transmitting path for enabling the vehicle to run in a reverse direction when being established by the engagements of the third friction engagement device and the dog clutch, wherein the third solenoid valve is configured, upon running of the vehicle in the reverse direction, to regulate a sixth hydraulic pressure by which the third friction engagement device is to be operated, wherein, upon running of the vehicle, the dog clutch is to be engaged with a source pressure, which is inputted to each of the fourth and fifth solenoid valves, being supplied to the dog clutch, wherein the plurality of hydraulic operations include, in addition to the first through third engaging operations and the stepless shifting operation, a fourth engaging operation that is executed to switch the third friction engagement device from a released state to an engaged state, and wherein, when the third and fourth engaging operations and the stepless shifting operation are to be executed as the required ones of the plurality of hydraulic operations, for running of the vehicle in the reverse direction, the transmission shifting control portion is configured to set the order of priority to a priority order pattern by which a priority is given to execution of each of the third and fourth engaging operations and the stepless shifting operation such that the third engaging operation, the fourth engaging operation and the stepless shifting operation are executed in this order.

According to a ninth aspect of the invention, in the control apparatus according to any one of the first through eighth aspects of the invention, the drive-force transmitting apparatus includes a fluid transmission device configured to transmit the drive force of the drive force source to the input rotary member, wherein the fluid transmission device includes a lockup clutch operable to directly connect between the drive force source and the input rotary member, wherein the plurality of solenoid valves further include a sixth solenoid valve configured to regulate a seventh hydraulic pressure by which the lockup clutch is to be operated, wherein the plurality of hydraulic operations include, in addition to the first through third engaging operations and the stepless shifting operation, a fifth engaging operation that is executed to switch the third friction engagement device from a releases state to an engaged state, and wherein, when the stepless shifting operation and the fifth engaging operation are to be executed as the required ones of the plurality of hydraulic operations, the transmission shifting control portion is configured to set the order of priority to a priority order pattern by which a higher priority is given to execution of the stepless shifting operation than to execution of the fifth engaging operation.

In the control apparatus according to the first aspect of the invention, when the rate of supply of the working fluid to the hydraulic control unit is to be insufficient relative to the rate of consumption of the working fluid in the hydraulic control unit if at least two of the plurality of hydraulic operations (including the first engaging operation, the second engaging operation, the third engaging operation and the stepless shifting operation) are executed in an overlapped manner, required ones of the plurality of hydraulic operations are executed in accordance with the order of priority that is dependent on, for example, the selected one of first and second running modes, so that it is possible to restrain occurrence of a failure due to insufficiency of the rate of supply of the working fluid. Therefore, when the rate of supply of the working fluid to the hydraulic control unit is to be insufficient relative to the rate of consumption of the working fluid in the hydraulic control unit, it is possible to reduce the failure that could affect running of the vehicle. In the following descriptions, the situation that "the rate of supply of the working fluid to the hydraulic control unit is to be insufficient relative to the rate of consumption of the working fluid in the hydraulic control unit" will be simply expressed as "the rate of supply of the working fluid is to be insufficient" where appropriate.

In the control apparatus according to the second aspect of the invention, when the second and third engaging operations are to be executed as the required ones of the plurality of hydraulic operations, the order of priority is set to a priority order pattern by which a higher priority is given to execution of the second engaging operation than to execution of the third engaging operation, so that it is possible to appropriately perform a running of the vehicle in the second running mode in which the engagement of the dog clutch is not required. Further, when the first and third engaging operations are to be executed as the required ones of the plurality of hydraulic operations, the order of priority is set to a priority order pattern by which a higher priority is given to execution of the third engaging operation than to execution of the first engaging operation, so that it is possible to appropriately perform a running of the vehicle in the first running mode in which the engagement of the dog clutch is required. Further, the running mode can be appropriately switched from the second running mode to the first running mod, by releasing and engaging the second friction engagement device and the first friction engagement device, respectively, while the dog clutch is in the engaged state.

In the control apparatus according to the third aspect of the invention, when the first engaging operation and the stepless shifting operation are to be executed as the required ones of the plurality of hydraulic operations, the order of priority is set to a priority order pattern by which a higher priority is given to execution of the first engaging operation than to execution of the stepless shifting operation, and when the second engaging operation and the stepless shifting operation are to be executed as the required ones of the plurality of hydraulic operations, the order of priority is set to a priority order pattern by which a higher priority is given to execution of the second engaging operation than to execution of the stepless shifting operation. Therefore, it is possible to prevent occurrence of a slippage of the transfer element due to insufficiency of the rate of supply of the working fluid, and to prioritize establishment of the drive-force transmitting path, i.e., transmission of the drive force, rather than execution of a shifting action of the continuously-variable transmission mechanism.

In the control apparatus according to the fourth aspect of the invention, when the accumulator filling operation and at least one of the plurality of hydraulic operations, which is other than the accumulator filling operation, are to be executed as the required ones of the plurality of hydraulic operations, with the shifting member being placed in the forward-drive operation position, the order of priority is set to a priority order pattern by which a higher priority is given to execution of the accumulator filling operation than to execution of any one of the at least one of the plurality of hydraulic operations, so that a hydraulic operation or operations relating to a forward running of the vehicle can be appropriately executed after the accumulator has been fully charged. Therefore, it is possible to prevent insufficiency of the rate of supply of the working fluid, which could be caused if the hydraulic operation or operations relating to the forward running are executed during the accumulator filling operation that is executed in response to the placement of the shifting member into the forward-drive operation position.

In the control apparatus according to the fifth aspect of the invention, when the third engaging operation and the stepless shifting operation in addition to the accumulator filling operation are to be executed as the required ones of the plurality of hydraulic operations, with the shifting member being placed in the forward-drive operation position, the third engaging operation and then the stepless shifting operation are executed after execution of the accumulator filling operation has been completed, in accordance with the priority order pattern, so that it is possible to prevent insufficiency of the rate of supply of the working fluid, which could be caused if the stepless shifting operation is executed during the accumulator filling operation that is executed in response to the placement of the shifting member into the forward-drive operation position. Thus, it is possible to avoid insufficiency of the rate of supply of the working fluid and accordingly prevent failure such as an undesirable release of the dog clutch when the dog clutch should be held in the engaged state. Further, it is possible to appropriately perform engagement of the dog clutch, which is required upon switching between the first and second running modes made by switching an operation state of each of the first and second friction engagement devices.

In the control apparatus according to the sixth aspect of the invention, when the first engaging operation in addition to the accumulator filling operation, the third engaging operation and the stepless shifting operation is to be executed as one of the required ones of the plurality of hydraulic operations, with the shifting member being placed in the forward-drive operation position, and with the first running mode being selected, the third engaging operation, the first engaging operation and the stepless shifting operation are executed in this order after execution of the accumulator filling operation has been completed, in accordance with the priority order pattern, so that it is possible to appropriately perform a forward running of the vehicle in the first running mode.

In the control apparatus according to the seventh aspect of the invention, when the second engaging operation in addition to the accumulator filling operation, the third engaging operation and the stepless shifting operation is to be executed as one of the required ones of the plurality of hydraulic operations, with the shifting member being placed in the forward-drive operation position, and with the second running mode being selected, the second engaging operation, the third engaging operation and the stepless shifting operation are executed in this order after execution of the accumulator filling operation has been completed, in accordance with the priority order pattern, so that it is possible to appropriately perform a forward running of the vehicle in the second running mode.

In the control apparatus according to the eighth aspect of the invention, when the third and fourth engaging operations and the stepless shifting operation are to be executed as the required ones of the plurality of hydraulic operations, for running of the vehicle in the reverse direction, the order of priority is set to a priority order pattern by which a priority is given to execution of each of the third and fourth engaging operations and the stepless shifting operation such that the third engaging operation, the fourth engaging operation and the stepless shifting operation are executed in this order, so that it is possible to appropriately perform a reverse running of the vehicle in the first running mode.

In the control apparatus according to the ninth aspect of the invention, when the stepless shifting operation and the fifth engaging operation are to be executed as the required ones of the plurality of hydraulic operations, the order of priority is set to a priority order pattern by which a higher priority is given to execution of the stepless shifting operation than to execution of the fifth engaging operation, so that a higher priority is given to the execution of a shifting action of the continuously-variable transmission mechanism than to the engagement of the lock-up clutch that is to be made, for example, for the purpose of reducing an energy consumption and improving a so-called "direct feeling" in transmission of the drivee force.

BRIEF DESCRIPTION OF THE DRAWINGS

FIG. 3 is a flow chart showing a main part of a control routine executed by the control apparatus, namely, a control routine that is executed for reducing failures that affect running of the vehicle, when a rate of supply of a working fluid is to be insufficient.

DETAILED DESCRIPTION OF PREFERRED EMBODIMENT

Figure 1:
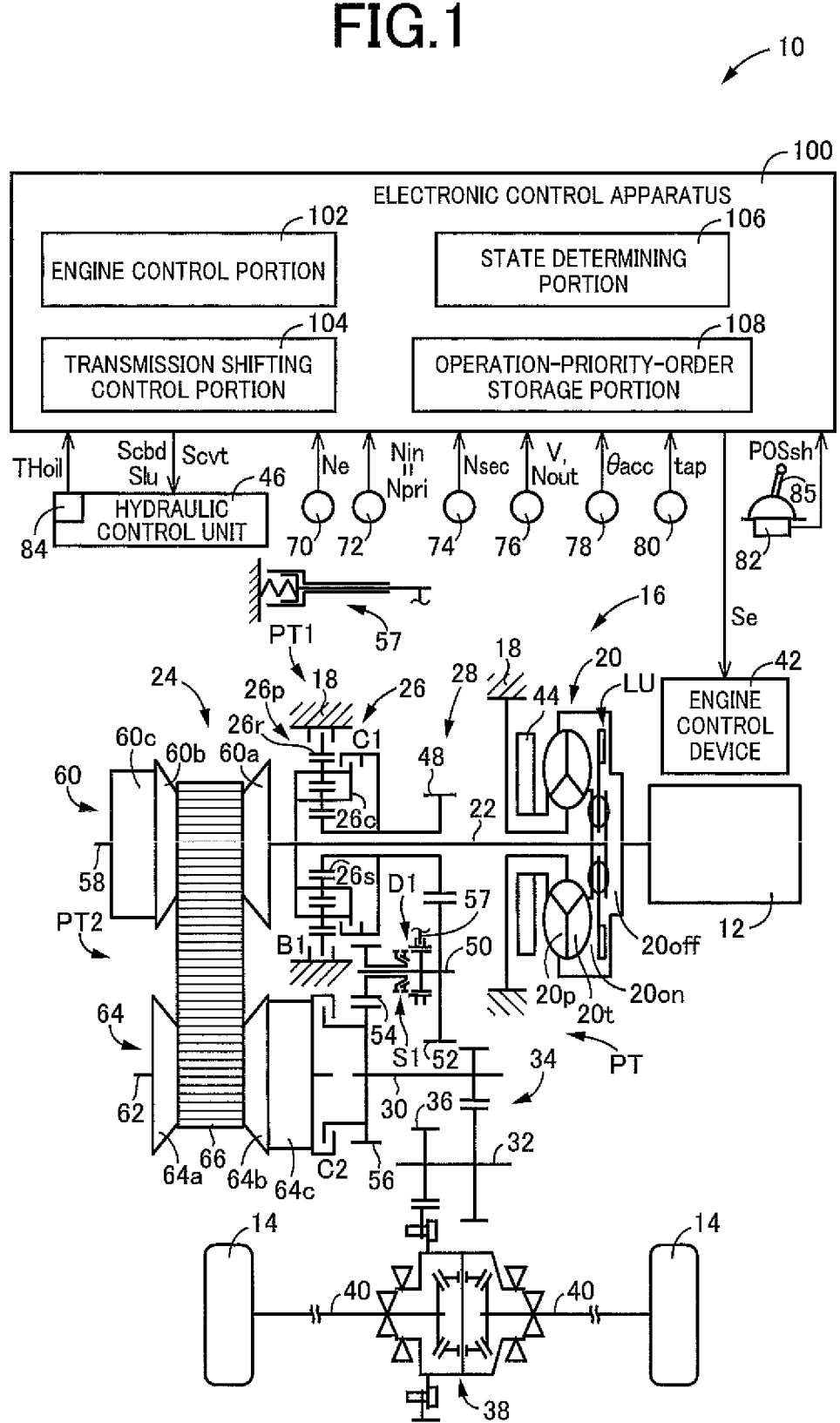
FIG. 1 is a schematic view showing a construction of a vehicle to be controlled by a control apparatus according to the present invention, and major control functions and control portions of the control apparatus.

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A pulley hydraulic pressure supplied to the primary pulley, i.e., a fourth hydraulic pressure by which the primary pulley is to be operated, is supplied to the hydraulic actuator of the primary pulley, while a pulley hydraulic pressure supplied to the secondary pulley, i.e., a fifth hydraulic pressure by which the secondary pulley is to be operated, is supplied to the hydraulic actuator of the secondary pulley. The hydraulic control unit may be configured to control a rate of flow of a working fluid supplied to each of the hydraulic actuators, for example, so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

Further, the term "gear ratio" is defined as "rotational speed of input-side rotary member/rotational speed of output-side rotary member". For example, the gear ratio of the above-described continuously-variable transmission is defined as "rotational speed of the primary pulley/rotational speed of the secondary pulley", and the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. For example, a highest gear ratio can be expressed also as a lowest-speed gear ratio.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

Embodiment

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 by the gear mechanism 28. The second drive-force transmitting path PT2 is a path through which the drive force of the engine 12 is to be transmitted from the input shaft 22 toward the drive wheels 14 by the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as an engagement device, is provided in the first drive-force transmitting path PT1 and configured to selectively connect and disconnect the first drive-force transmitting path PT1, such that the first drive-force transmitting path PT1 is established with engagement of the first clutch C1 for forward running of the vehicle 10. The first brake B1, which serves as another engagement device, is provided in the first drive-force transmitting path PT1 and configured to selectively connect and disconnect the first drive-force transmitting path PT1, such that the first drive-force transmitting path PT1 is established with engagement of the first brake B1 for reverse running of the vehicle 10. That is, the first drive-force transmitting path PT1 is established with either the first clutch C1 or the first brake B1 being engaged. The second clutch C2, which serves as still another engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a corresponding one of hydraulic actuators C1a, B1a, C2a. The first clutch C1, second clutch C2 and first brake B1 corresponds to "first, second and third friction engagement devices", respectively, which are recited in appended claims. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 100 (that corresponds to "control apparatus" recited in the appended claims), based on an operation amount θacc of an accelerator pedal that corresponds to a required drive force of the vehicle 10 required by an operator of the vehicle 10, whereby an engine torque Te as an output torque of the engine 12 is controlled.

The torque converter 20 is provided with a pump impeller 20p and a turbine impeller 20t that are connected to the engine 12 and the input shaft 22, respectively. The torque converter 20 is a fluid transmission device configured to transmit a drive force of the engine 12 to the input shaft 22. The torque converter 20 is provided with also a known lock-up clutch LU disposed between the pump impeller 20p and the turbine impeller 20t that serve as an input rotary member and an output rotary member of the torque converter 20, respectively, so that the pump impeller 20p and the turbine impeller 20t are rotatable integrally with each other when the lockup clutch LU is engaged. That is, the input shaft 22 is rotatable integrally with a drive shaft of the engine 12.

The drive-force transmitting apparatus 16 is provided with a mechanical oil pump 44 connected to the pump impeller 20p. The oil pump 44 is to be driven by the engine 12, to supply a pressurized working fluid as a source pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, switching an operation state of each of the above-described engagement devices between its engaged state and released state and switching an operation state of the lock-up clutch LU. That is, the oil pump 44 supplies, to the hydraulic control unit 46, the working fluid that is to be regulated to a source pressure inputted to each of a plurality of solenoid valves SL that are described below.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. The dog clutch D1 includes a known synchronized meshing mechanism S1 as a synchronization mechanism configured to synchronize rotations of members of the dog clutch D1 upon engagement of the members. An operation state of the dog clutch D1 is switched by operation of a hydraulic actuator 57 that is included in the drive-force transmitting apparatus 16.

The first drive-force transmitting path PT1 is established with both of engagement of the dog clutch D1 and engagement of either one of the first clutch C1 and the first brake B1 which are located to be closer to the input shaft 22 than the dog clutch D1. A forward-running drive-force transmitting path is established by engagement of the first clutch C1, and a reverse-running drive-force transmitting path is established by engagement of the first brake B1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
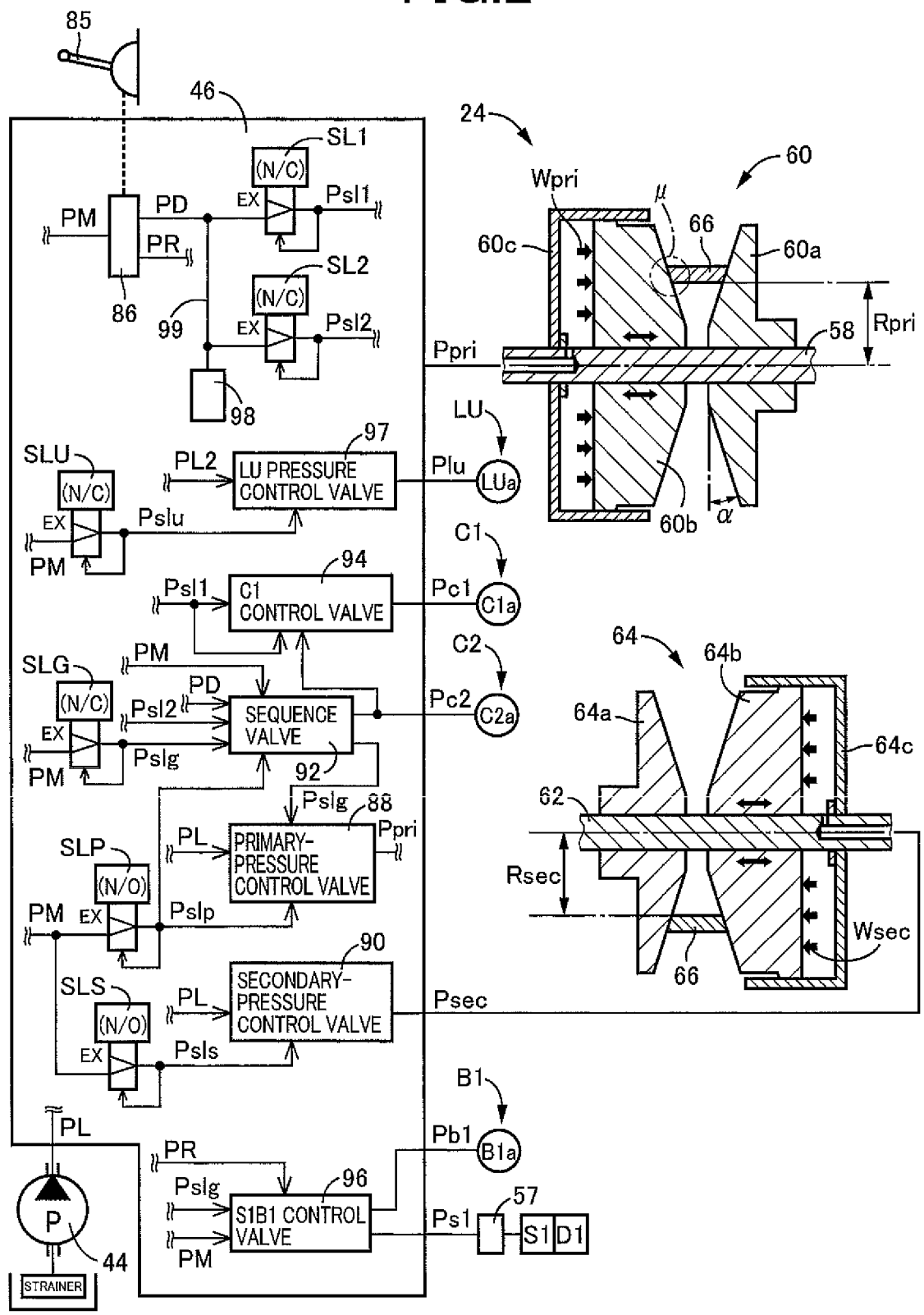
FIG. 2 is a view for explaining a construction of a continuously-variable transmission mechanism and a construction of a hydraulic control unit.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wsec to the movable sheave 64b. The secondary thrust Wsec is a thrust (=secondary pressure Psec pressure receiving area) for changing a width of a V-shaped groove defined between the fixed and movable sheaves 64a, 64b of the secondary pulley 64. That is, the secondary thrust Wsec is a thrust applied to the secondary pulley 64 from the secondary hydraulic actuator 64c, to clamp the transmission belt 66 that is mounted on the secondary pulley 64. The secondary pressure Psec is a hydraulic pressure supplied from the hydraulic control unit 46 to the secondary hydraulic actuator 64c, and serves as a pulley hydraulic pressure for generating the secondary thrust Wsec.

In the continuously-variable transmission mechanism 24, the primary and secondary pressures Ppri, Pout are controlled by the hydraulic control unit 46 that is controlled by the electronic control apparatus 100, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding diameter (effective diameter) of each of the pulleys 60, 64 is changeable and accordingly a gear ratio $\gamma$cvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio $\gamma$cvt of the continuously-variable transmission mechanism 24 is controlled to a target gear ratio $\gamma$cvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Ppri is increased, the width of the V-shaped groove of the primary pulley 60 is reduced whereby the gear ratio $\gamma$cvt is reduced. The reduction of the gear ratio $\gamma$cvt corresponds to a shift-up action performed in the continuously-variable transmission mechanism 24. In the continuously-variable transmission mechanism 24, the lowest gear ratio $\gamma$min is provided with the width of the V-shaped groove of the primary pulley 60 being minimized. Within a range of the gear ratio $\gamma$cvt that can be provided by the continuously-variable transmission mechanism 24, the lowest gear ratio gear ratio $\gamma$min is a value of the gear ratio $\gamma$cvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio $\gamma$cvt is increased. The increase of the gear ratio $\gamma$cvt corresponds to a shift-down action performed in the continuously-variable transmission mechanism 24. In the continuously-variable transmission mechanism 24, the highest gear ratio $\gamma$max is provided with the width of the V-shaped groove of the primary pulley 60 being maximized. Within the range of the gear ratio $\gamma$cvt that can be provided by the continuously-variable transmission mechanism 24, the highest gear ratio gear ratio $\gamma$max is a value of the gear ratio $\gamma$cvt which makes it possible to minimize the running speed of the vehicle 10. In the continuously-variable transmission mechanism 24, the belt slippage is prevented by the primary thrust Wpri and the secondary thrust Wsec, and the target gear ratio γcvttgt is established by a combination of the primary thrust Wpri and the secondary thrust Wsec, rather than by only one of the primary thrust Wpri and the secondary thrust Wsec. As described below, the gear ratio γcvt of the continuously-variable transmission mechanism 24 is changed with change of a thrust ratio τ (=Wsec/Wpri) which is a ratio of the secondary thrust Wsec to the primary thrust Wpri and which is dependent on a relationship between the primary pressure Ppri and the secondary pressure Psec. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The secondary shaft 62 corresponds to "second-engagement-device rotary member" recited in the appended claims. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode (as a first running mode) and the belt running mode (as a second running mode). The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, the second clutch C2 is engaged while the first clutch C1 and the first brake B1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 100 as a controller including the control apparatus constructed according to present invention. For example, the electronic control apparatus 100 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 100 is configured to perform, for example, an engine control operation for controlling an output of the engine 12, a shifting control operation and a belt-clamping-force control operation for the continuously-variable transmission mechanism 24, and a hydraulic control operation for switching the operation state of each of the plurality of engagement devices (C1, B1, C2, D1). The electronic control apparatus 100 may be constituted by two or more control units exclusively assigned to perform different control operations such as the engine control operation and the hydraulic control operation.

The electronic control apparatus 100 receives various input signals based on values detected by respective sensors provided in the vehicle 10. Specifically, the electronic control apparatus 100 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; an output signal of a shift position sensor 82 indicative of an operation position POSsh of a manually-operated shifting member in the form of a shift lever 85 provided in the vehicle 10; and an output signal of a temperature sensor 84 indicative of a working fluid temperature THoil of a working fluid in the hydraulic control unit 46. Further, the electronic control apparatus 100 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, a hydraulic-control command signal Scbd for performing hydraulic controls of operation states of the plurality of engagement devices, and a hydraulic-control command signal Slu for performing a hydraulic control of an operation state of the lockup clutch LU. It is noted that the input-shaft rotational speed Nin (=primary rotational speed Npri) is equivalent to a rotational speed of the turbine-impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 100 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 85 is operable to be placed in a selected one of a plurality of operation positions POSsh that consist of, for example, a parking position P, a reverse position R, a neutral position N and a forward drive position D. With the shift lever 85 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 85 being placed in the reverse position R, the drive-force transmitting apparatus 16 is placed in its reverse drive position for enabling the reverse running of the vehicle 10 in the gear running mode. With the shift lever 85 being placed in the neutral position N, the drive-force transmitting apparatus 16 is placed in its neutral position in which the drive-force transmitting apparatus 16 is placed in its neutral state. With the shift lever 85 being placed in the forward drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

As shown in FIG. 2, the hydraulic control unit 46 includes a plurality of solenoid valves SL, a mechanical valve 86 as a switching valve, a primary-pressure control valve 88, a secondary-pressure control valve 90, a sequence valve 92, a C1 control valve 94, a S1B1 control valve 96, a LU-pressure control valve 97 and an accumulator 98.

The mechanical valve 86 is mechanically associated with the shift lever 85, so that an operation state of the mechanical valve 86 is to be switched in association with a switching operation made through the shift lever 85 by the vehicle operator, namely, a fluid passage defined by the mechanical valve 86 is changed by the switching operation. The mechanical valve 86 is operated such that a modulator pressure PM, which is inputted to the mechanical valve 86, is outputted as a drive pressure PD when the shift lever 85 is placed in the drive position D, and such that the modulator pressure PM is outputted as a reverse pressure PR when the shift lever 85 is placed in the reverse position R. Further, when the shift lever 85 is placed in the neutral position N or in the parking position P, the mechanical valve 86 is operated to stop flow of the modulator pressure PM therethrough, and to cause the drive pressure PD and the reverse pressure PR to be discharged. The drive pressure PD may be referred also to as a drive range pressure or a forward hydraulic pressure. The reverse pressure PR may be referred also to as a reverse range pressure or a reverse hydraulic pressure. The hydraulic control unit 46 further includes a primary regulator valve (not shown) to which a hydraulic pressure is supplied from the oil pump 44. The hydraulic pressure supplied to the primary regulator valve is regulated, by the primary regulator valve, to a pressure value dependent on a degree of an engine load that is represented by, for example, the throttle opening degree tap. The thus regulated hydraulic pressure is supplied as a line pressure PL to a modulator valve (not shown) that is also included in the hydraulic control unit 46. The line pressure PL is regulated by the modulator valve to a certain pressure value, and is supplied as the modulator pressure PM to the mechanical valve 86.

Each of the plurality of solenoid valves SL is subjected to an electric-current control executed by the electronic control apparatus 100, so as to regulate a hydraulic pressure and output the regulated hydraulic pressure, by using the working fluid supplied from the oil pump 44. The plurality of solenoid valves SL include a C1 solenoid valve SL1 as a first solenoid valve, a C2 solenoid valve SL2 as a second solenoid valve, a D1 solenoid valve SLG as a third solenoid valve, a primary-pulley solenoid valve SLP as a fourth solenoid valve, a secondary-pulley solenoid valve SLS as a fifth solenoid valve and a LU solenoid valve SLU as a sixth solenoid valve. The C1 solenoid valve SL1, C2 solenoid valve SL2, D1 solenoid valve SLG and LU solenoid valve SLU are normally-closed electromagnetic valves. The primary-pulley solenoid valve SLP and secondary-pulley solenoid valve SLS are normally-open electromagnetic valves. Each of the normally-closed electromagnetic valves is placed in an OFF-failure state in which the valve does not output a hydraulic pressure in the event of an electrical disconnection in which, for example, supply of a drive current from the electronic control apparatus 100 is cut off. Each of the normally-open electromagnetic valves is placed in an ON-failure state in which the valve outputs a maximum hydraulic pressure in the event of the electrical disconnection.

The C1 solenoid valve SL1 receives the drive pressure PD as a source pressure, and outputs a SL1 pressure Psl1 that is to be converted into a C1 control pressure Pc1 supplied to the hydraulic actuator C1a of the first clutch C1. That is, the C1 solenoid valve SL1 is configured to regulate the C1 control pressure Pc1 as a first hydraulic pressure by which the first clutch C1 is to be operated. The C2 solenoid valve SL2 receives the drive pressure PD as a source pressure, and outputs a SL2 pressure Psl2 that is to be converted into a C2 control pressure Pc2 supplied to the hydraulic actuator C2a of the second clutch C2. That is, the C2 solenoid valve SL2 is configured to regulate the C2 control pressure Pc2 as a second hydraulic pressure by which the second clutch C2 is to be operated.

The D1 solenoid valve SLG receives the modulator pressure PM as a source pressure, and outputs a SLG pressure Pslg that is to be converted into a synchronization control pressure Ps1 supplied to the hydraulic actuator 57 for switching an operation state of the dog clutch D1. That is, the D1 solenoid valve SLG is configured to regulate the synchronization control pressure Ps1 as a third hydraulic pressure by which the dog clutch D1 is to be operated. It is noted that, upon reverse running of the vehicle 10 in which the reverse pressure PR is outputted from the mechanical valve 86 with the shift lever 85 being placed in the reverse position R, the SLG pressure Pslg can be converted into a B1 control pressure Pb1 supplied to a hydraulic actuator B1a of the first brake B1. That is, the D1 solenoid valve SLG is configured, upon reverse running of the vehicle 10, to regulate the B1 control pressure Pb1 as a sixth hydraulic pressure by which the first brake B1 is to be operated.

The primary-pulley solenoid valve SLP receives the modulator pressure PM as a source pressure, and outputs a SLP pressure Pslp for controlling the primary pressure Ppri that is supplied to the hydraulic actuator 60c of the primary pulley 60. That is, the primary-pulley solenoid valve SLP is configured to regulate the primary pressure Ppri as a fourth hydraulic pressure by which the primary pulley 60 is to be operated. The secondary-pulley solenoid valve SLS receives the modulator pressure PM as a source pressure, and outputs a SLS pressure Psls for controlling the secondary pressure Psec that is supplied to the hydraulic actuator 64c of the secondary pulley 64. That is, the secondary-pulley solenoid valve SLS is configured to regulate the secondary pressure Psec as a fifth hydraulic pressure by which the secondary pulley 64 is to be operated.

The LU solenoid valve SLU receives the modulator pressure PM as a source pressure, and outputs a SLU pressure Pslu for controlling the LU control pressure Plu that is supplied to a hydraulic actuator LUa of the lock-up clutch LU. That is, the LU solenoid valve SLU is configured to regulate the LU control pressure Plu as a seventh hydraulic pressure by which the lock-up clutch LU is to be operated. The hydraulic actuator LUa is constituted by, for example, an engaging-side fluid chamber 20on and a releasing-side fluid chamber 20off that are provided within the torque converter 20 (see FIG. 1). The LU control pressure Plu corresponds to a difference between a hydraulic pressure in the engaging-side fluid chamber 20on and a hydraulic pressure in the releasing-side fluid chamber 20off.

The primary-pressure control valve 88 receives the line pressure PL as a source pressure, and is operated based on the SLP pressure Pslp so as to regulate the primary pressure Ppri. In the primary-pressure control valve 88, the primary pressure Ppri is made larger as the SLP pressure Pslp is larger. The secondary-pressure control valve 90 receives the line pressure PL as a source pressure, and is operated based on the SLS pressure Psls so as to regulate the secondary pressure Psec.

The sequence valve 92 is placed in a selected one of a normal position and a failure position, which is selected based on the SLP pressure Pslp. When being placed in the normal position, the sequence valve 92 establishes a fluid passage through which the SL2 pressure Psl2 is to be supplied to the second clutch C2. When being placed in the failure position, the sequence valve 92 establishes a fluid passage through which the drive pressure PD is to be supplied to the second clutch C2. The sequence valve 92 is held in the normal position by the modulator pressure PM and a biasing force of a spring (not shown), and is switched to the failure position when the SLP pressure Pslp is applied to the sequence valve 92. The SLP pressure Pslp having at least a predetermined pressure value is outputted when the C2 solenoid valve SL2 is placed in the OFF-failure state, for example, in the event of the electrical disconnection, whereby the sequence valve 92 is switched to the failure position. In this instance, if the shift lever 85 is placed in the forward drive position D, the drive pressure PD is compulsorily supplied to the second clutch C2 whereby the second clutch C2 is engaged. Each of the SL2 pressure Psl2 and the drive pressure PD is supplied as the C2 control pressure Pc2 to the second clutch C2 through the sequence valve 92.

When being placed in the failure position, the sequence valve 92 establishes also a fluid passage through which the SLG pressure Pslg is to be supplied to the primary-pressure control valve 88. The primary-pressure control valve 88 defines a fluid chamber that is configured to receive the SLG pressure Pslg such that the SLG pressure Pslg constitutes a thrust that acts against a thrust constituted by the SLP pressure Pslp. When the sequence valve 92 is switched to the failure position by the SLP pressure Pslp applied to the sequence valve 92, the SLG pressure Pslg can be supplied to the fluid chamber of the primary-pressure control valve 88. If the SLP pressure Pslp is increased, the primary pressure Ppri outputted from the primary-pressure control valve 88 is increased whereby a shift-up action could be caused in the continuously-variable transmission mechanism 24. In the present embodiment, the SLG pressure Pslg is supplied to the fluid chamber of the primary-pressure control valve 88 whereby the primary pressure Ppri is reduced thereby making it possible to cause a shift-down action in the continuously-variable transmission mechanism 24.

The C1 control valve 94 is placed in a selected one of a normal position and a failure position, which is selected based on the SL1 pressure Psl1 and the C2 control pressure Pc2. When being placed in the normal position, the C1 control valve 94 establishes a fluid passage through which the SL1 pressure Psl1 is to be supplied to the first clutch C1. When being placed in the failure position as a tie-up preventing state, the C1 control valve 94 establishes a fluid passage through which the C1 control pressure Pc1 is to be discharged. The C1 control valve 94 is switched to the failure position, when the SL1 pressure Psl1 and the C2 control pressure Pc2 are both applied to the C1 control valve 94. The SL1 pressure Psl1 is supplied as the C1 control pressure Pc1 to the first clutch C1 through the C1 control valve 94. The C1 control valve 94 serves as a fail-safe valve that prevents a tie-up made by concurrent engagements of the first and second clutches C1, C2, by cutting off the fluid passage through which the SL1 pressure Psl1 is to be supplied as the C1 control pressure Pc1 to the first clutch C1.

The S1B1 control valve 96 is placed in a selected one of a non-R position and a R position, which is selected based on the reverse pressure PR. When being placed in the non-R position, the S1B1 control valve 96 establishes a fluid passage through which the SLG pressure Pslg is to be supplied to the hydraulic actuator 57, and also another fluid passage through which the B1 control pressure Pb1 is to be discharged. When being placed in the R position, the S1B1 control valve 96 establishes a fluid passage through which the modulator pressure PM is to be supplied to the hydraulic actuator 57, and also another fluid passage through which the SLG pressure Pslg is to be supplied to the first brake B1. The S1B1 control valve 96 is switched to the R position when the reverse pressure PR is applied to the S1B1 control valve 96. The SLG pressure Pslg is supplied as the synchronization control pressure Ps1 to the hydraulic actuator 57 when the shift lever 85 is placed in any one of the operation positions that are other than the reverse position R. On the other hand, when the shift lever 85 is placed in the reverse position R, namely, when the vehicle 10 runs in a reverse direction, the SLG pressure Pslg is supplied as the B1 control pressure Pb1 to the first brake B1 through the S1B1 control valve 96. Further, when the shift lever 85 is placed in the reverse position R, the modulator pressure PM is supplied as the synchronization control pressure Ps1 to the hydraulic actuator 57 through the S1B1 control valve 96. Further, for reverse running of the vehicle 10, the dog clutch D1 is engaged with supply of the modulator pressure PM (that is inputted to the primary-pulley solenoid valve SLP and the secondary-pulley solenoid valve SLS as the original pressure) to the dog clutch D1.

The LU-pressure control valve 97 is placed in a selected one of an ON position and an OFF position, which is selected based on the SLU pressure Pslu. When being placed in the ON position, the LU-pressure control valve 97 establishes a fluid passage through which the second line pressure PL2 is to be supplied to the engaging-side fluid chamber 20on, and also another fluid passage through which the releasing-side fluid chamber 20off is in communication with a discharge fluid passage (not shown). When being placed in the OFF position, the LU-pressure control valve 97 establishes a fluid passage through the second line pressure PL2 is to be supplied to the releasing-side fluid chamber 20off, and also another fluid passage through the engaging-side fluid chamber 20on is in communication with a discharge fluid passage (not shown). Thus, the LU control pressure Plu, which corresponds to the difference between the hydraulic pressure in the engaging-side fluid chamber 20on and the hydraulic pressure in the releasing-side fluid chamber 20off, is controlled whereby an operation state of the lock-up clutch LU is switched. The LU-pressure control valve 97 is placed in the ON position by application of the SLU pressure Pslu to the LU-pressure control valve 97. The lock-up clutch LU is switched from a released state from an engaged state (i.e., lock-up ON state) when the SLU pressure Pslu having at least a predetermined pressure value is applied to the lock-up clutch LU. The second line pressure PL2 is a hydraulic pressure that is regulated by a secondary regulator valve (not shown) that receives, as a source pressure, a hydraulic pressure, which is discharged from the above-described primary regulator valve (not shown) when the line pressure PL is regulated by the primary regulator valve.

The accumulator 98 is connected to the drive-pressure passage 99, so as to store the drive pressure PD that flows through the drive-pressure passage 99. The accumulator 98 is a known hydraulic accumulator which includes a spring and a sealing member restraining leakage of a working fluid and which is capable of accumulating a hydraulic pressure and supplying the accumulated hydraulic pressure. When a hydraulic pressure in the drive-pressure passage 99 is higher than a hydraulic pressure in the accumulator 98, the hydraulic pressure is supplied from the drive-pressure passage 99 to the accumulator 98. When the hydraulic pressure in the accumulator 98 is higher than the hydraulic pressure in the drive-pressure passage 99, the hydraulic pressure is supplied from the accumulator 98 to the drive-pressure passage 99.

An operation state of the first clutch C1 is switched with change of the torque capacity of the first clutch C1, which is made based on the C1 control pressure Pc1. An operation state of the second clutch C2 is switched with change of the torque capacity of the second clutch C2, which is made based on the C2 control pressure Pc2. The torque capacity of the first clutch C1 is C1 clutch torque Tcltc1, and the torque capacity of the second clutch C2 is C2 clutch torque Tcltc2. The hydraulic control unit 46 supplies, to the hydraulic actuators C1a, C2a, the respective control pressures Pc1, Pc2 in accordance with hydraulic command values represented in the hydraulic-control command signal Scbd outputted from the electronic control apparatus 100. The hydraulic command value of the C1 control pressure Pc1 is C1 command pressure value, and the hydraulic command value of the C2 control pressure Pc2 is C2 command pressure value.

For performing various control operations in the vehicle 10, the electronic control apparatus 100 includes an engine control means or portion in the form of an engine control portion 102 and a transmission shifting control means or portion in the form of a transmission shifting control portion 104.

The engine control portion 102 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 102 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 85 is the parking position P or the neutral position N during stop of the vehicle 10, the transmission shifting control portion 104 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 104 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 104 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 104 executes a switching control operation for switching the running mode between the gear running mode and the belt running mode. Specifically, the transmission shifting control portion 104 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 104 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 104 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 104 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following descriptions relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission shifting control portion 104 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 104 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following descriptions relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 104 supplies, to the hydraulic control unit 46, the hydraulic-control command signal Scvt for controlling the primary pressure Ppri and the secondary pressure Psec such that the target gear ratio γcvttgt is established in the continuously-variable transmission mechanism 24 while the belt slippage is not caused in the continuously-variable transmission mechanism 24.

Specifically, the transmission shifting control portion 104 calculates the target primary rotational speed Nprit by applying the accelerator operation amount θacc and the vehicle running speed V into a predetermined relationship in the form of a CVT shifting map. Then, the transmission shifting control portion 104 calculates the target gear ratio γcvttgt (=Nprit/Nsec) based on the target primary rotational speed Nprit. Further, the transmission-shifting control portion 104 calculates an estimated value of the engine torque Te, for example, by applying the throttle opening degree tap and the engine rotational speed Ne to a predetermined relationship such as an engine torque map. Then, the transmission-shifting control portion 104 calculates a turbine torque Tt, based on the estimated value of the engine torque Te and a predetermined relationship such as characteristic of the torque converter 20. The transmission-shifting control portion 104 handles or regards the turbine torque Tt as a primary input torque Tpri that is an input torque inputted to the primary pulley 60. The primary input torque Tpri is a torque that is to act on the primary shaft 58. The transmission shifting control portion 104 calculates a thrust ratio T for establishing a target gear ratio γcvtt, by applying the target gear ratio γcvtt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission shifting control portion 104 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission shifting control portion 104 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 104 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

In calculation of each of the target primary thrust Wprit and the target secondary thrust Wsect, a required thrust, which is minimally required to prevent the belt slippage in the continuously-variable transmission mechanism 24, is taken into consideration. This required thrust is a belt-slip limit thrust that is a thrust value shortly before occurrence of the belt slippage in the continuously-variable transmission mechanism 24.

The transmission shifting control portion 104 sets a primary limit thrust Wprilim that is the limit thrust for the primary pulley 60 and a secondary limit thrust Wseclim that is the limit thrust for the secondary pulley 64. The transmission shifting control portion 104 sets the primary limit thrust Wprilim by using equation (1) given below, and sets the secondary limit thrust Wseclim by using equation (2) given below. In the equations (1) and (2), "a" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24 (see FIG. 2). It is noted that the sheave angle α is an angle defined between a conical surface of each of the pulleys 60, 64 and a plane perpendicular to an axis of a corresponding one of the pulleys 60, 64 (see FIG. 2).

$$Wprilim = (Tpr \cdot \cos\alpha)/(2 \cdot \mu \cdot Rpri) \quad (1)$$

$$Wseclim = (\gamma cvt \cdot Tpri \cdot \cos\alpha)/(2 \cdot \mu \cdot Rsec) \quad (2)$$

The transmission shifting control portion 104 calculates a secondary shifting-control thrust Wsecsh (=τ·Wprilim) as a thrust that is required to be applied to the secondary pulley 64 for the shift control, based on the primary limit thrust Wprilim and the thrust ratio τ that is required to establish the target gear ratio γcvtt. The transmission shifting control portion 104 sets, as a target secondary thrust Wsect, a larger one of the secondary limit thrust Wseclim and the secondary shifting-control thrust Wsecsh. The transmission shifting control portion 104 calculates the target primary thrust Wprit (=Wsect/τ), based on the target secondary thrust Wsect and the thrust ratio τ that is required to establish the target gear ratio γcvtt.

By the way, a performance regarding a balance between a rate of supply of the working fluid supplied from the oil pump 44 to the hydraulic control unit 46 and a rate of consumption of the working fluid in the hydraulic control unit 46 is limited, for example, by the engine rotational speed Ne and the working fluid temperature THoil. When the flow rate of the working fluid supplied from the oil pump 44 is reduced with reduction of the engine rotational speed Ne, or when the working fluid temperature THoil is made so high that a leakage amount of the working fluid is increased in the hydraulic control unit 46, the rate of supply of the working fluid to the hydraulic control unit 46 is made small relative to the rate of consumption of the working fluid in the hydraulic control unit 46, so that the performance regarding the balance is likely to be reduced. Such a phenomenon is more remarkable as the oil pump 44 is made in more compact for improving a fuel economy.

The consumption of the working fluid is made in the hydraulic control unit 46, for example, when a first engaging operation in the form of a C1 engaging operation that is executed to switch the first clutch C1 from the released state to the engaged state, a second engaging operation in the form of a C2 engaging operation that is executed to switch the second clutch C2 from the released state to the engaged state, a third engaging operation in the form of a synchronized engaging operation that is executed to switch the dog clutch D1 from the released state to the engaged state, a fourth engaging operation in the form of a B1 engaging operation that is executed to switch the first brake B1 from the released state to the engaged state, a fifth engaging operation in the form of a LU engaging operation that is executed to switch the lock-up clutch LU from the released state to the engaged state, and a stepless shifting operation that is executed to cause a shifting action in the continuously-variable transmission mechanism 24, namely, to operate the primary pulley 60 and/or the secondary pulley 64. On the other hand, the consumption of the working fluid in the hydraulic control unit 46 is not made, for example, by each of the engagement devices (C1, B1, C2, D1, LU) when the engagement device is in a releasing process state, a fully engaged state and a fully released state, and by the continuously-variable transmission mechanism 24 when the gear ratio γcvt is kept constant.

Further, in the hydraulic control unit 46, the accumulator 98 is connected to the drive-pressure passage 99 through which the drive pressure PD is to flow, so as to be disposed in a position to which the source pressures of the C1 solenoid valve SL1 and the C2 solenoid valve SL2 are to be supplied. Therefore, the drive pressure PD is influenced or affected by a storage state of the working fluid in the accumulator 98. For example, when the shift lever 85 is placed to the forward drive position D from another operation position that is other than the forward drive position D, the drive pressure PD is outputted from the mechanical valve 86. When an accumulator filling operation is executed to fill the accumulator 98 with the drive pressure PD outputted from the mechanical valve 86, a consumption of the working fluid is caused. On the other hand, no accumulator is provided for the reverse pressure PR, so that the reverse pressure PR is not affected by a storage state of the working fluid in an accumulator, unlike the drive pressure PD. It is noted that the accumulator filling operation is an operation executed automatically as a consequence of a switching operation made through the shift lever 85, and is not an operation executed compulsorily by the electronic control apparatus 100 to cause a consumption of the working fluid.

When the performance regarding the balance between the rate of supply of the working fluid and the rate of consumption of the working fluid is reduced, if at least two of a plurality of hydraulic operations (such as the accumulator filling operation) that require consumption of the working fluid are executed in an overlapped manner, there is a possibility that a rate of supply of the working fluid to the hydraulic control unit 46 could be insufficient relative to a rate of consumption of the working fluid in the hydraulic control unit 46. In the following descriptions relating to the present embodiment, the situation that "the rate of supply of the working fluid to the hydraulic control unit 46 becomes insufficient relative to the rate of consumption of the working fluid in the hydraulic control unit 46" will be simply expressed as "the rate of supply of the working fluid becomes insufficient" where appropriate. If the rate of supply of the working fluid becomes insufficient, for example, the modulator pressure PM is reduced whereby there is a concern of occurrence of mechanical failure such as a belt slippage and a clutch disengagement in which the dog clutch D1 is undesirably released when it should be in the engaged state.

Hereinafter, there will be described, by way of examples, some phenomenons that could happen in a case in which two or more hydraulic operations are executed in an overlapped manner in a working-fluid insufficient region in which the rate of supply of the working fluid is likely to be insufficient. Each of the below-described phenomenons is what could happen when two hydraulic operations are executed in an overlapped manner. A phenomenon, which could happen when three or more hydraulic operations are executed in an overlapped manner, is substantially the same as the phenomenon that could happen when two of the three or more hydraulic operations are executed in an overlapped manner, or corresponds to a combination of the phenomenons each could happen when two of the three or more hydraulic operations are executed in an overlapped manner.

When the dog clutch D1 is switched to the engaged state during a shifting action executed in the continuously-variable transmission mechanism 24, namely, when the synchronized engaging operation and the stepless shifting operation are executed in an overlapped manner, there is a concern that a belt slippage could occur due to insufficiency of the belt torque capacity Tcvt, for example.

When the shift lever 85 is placed from the neutral position N to the drive position D and the dog clutch D1 is switched to the engaged state immediately after an engine start or during running of the vehicle 10, namely, when the synchronized engaging operation and the accumulator filling operation are executed in an overlapped manner, a synchronized action is made difficult to be performed in the synchronized meshing mechanism S1 due to insufficiently of the synchronization control pressure Ps1, so that there is a concern of occurrence of a synchronized engagement failure such as gear noise generation and failure in engagement of the dog clutch D1.

When the dog clutch D1 and the first clutch C1 are both switched to their engaged states during running of the vehicle 10, namely, when the synchronized engaging operation and the C1 engaging operation are executed in an overlapped manner, there is a concern of gear noise generation in the synchronized engaging operation, for example. Since the forward-driving first drive-force transmitting path is established by engagements of the dog clutch D1 and the first clutch C1, there is concern that that the gear noise could be generated if the synchronized engaging operation is executed during the running with the first clutch C1 being in the engaged state. The generation of the gear noise, which could be generated when the synchronized engaging operation and the C1 engaging operation are executed in an overlapped manner, is substantially the same phenomenon as the generation of the gear noise, which could be generated when the synchronized engaging operation is executed with the first clutch C1 being in the engaged state.

When the dog clutch D1 and the second clutch C2 are both switched to their engaged states during running of the vehicle 10, namely, when the synchronized engaging operation and the C2 engaging operation are executed in an overlapped manner, a synchronized action is made difficult to be performed in the synchronized meshing mechanism S1 due to insufficiently of the synchronization control pressure Ps1, so that there is a concern of occurrence of the synchronized engagement failure, for example.

When the shift lever 85 is placed from the neutral position N to the forward drive position D and a shifting action is executed in the continuously-variable transmission mechanism 24 during running of the vehicle 10, namely, when the stepless shifting operation and the accumulator filling operation are executed in an overlapped manner, there is a concern of occurrence of the synchronized engagement failure such as clutch disengagement due to insufficiency of the synchronization control pressure Ps1, for example. The stepless shifting operation, which is to be executed in this instance, is, for example, a shift-down operation for making a so-called "belt rerun" in the continuously-variable transmission mechanism 24, namely, increasing the gear ratio γcvt of the continuously-variable transmission mechanism 24 to the highest gear ratio γmax, when the "belt return" is not yet made in the continuously-variable transmission mechanism 24, namely, the gear ratio γcvt of the continuously-variable transmission mechanism 24 is not yet returned to the highest gear ratio γmax.

When the first clutch C1 is switched to the engaged state with the "belt return" being not yet made in the continuously-variable transmission mechanism 24 during running of the vehicle 10, namely, when the stepless shifting operation and the C1 engaging operation are executed in an overlapped manner during running of the vehicle 10, there is a concern of occurrence of the synchronized engagement failure such as clutch disengagement due to insufficiency of the synchronization control pressure Ps1, for example.

When the stepped shift-down action is executed to switch from the belt running mode to the gear running mode with the "belt return" being not yet made in the continuously-variable transmission mechanism 24, namely, when the stepless shifting operation and the C1 engaging operation are executed in an overlapped manner, there is a concern of occurrence of the belt slippage due to insufficiency of the belt torque capacity Tcvt, for example.

When the second clutch C2 is switched to the engaged state with the "belt return" being not yet made in the continuously-variable transmission mechanism 24 during running of the vehicle 10, namely, when the stepless shifting operation and the C2 engaging operation are executed in an overlapped manner during running of the vehicle 10, there is a concern of occurrence of the belt slippage due to insufficiency of the belt torque capacity Tcvt, for example.

When the shift lever 85 is placed from the neutral position N to the forward drive position D and the first clutch C1 is switched to the engaged state, namely, when the accumulator filling operation and the C1 engaging operation are executed in an overlapped manner, there is a concern of occurrence of the synchronized engagement failure such as clutch disengagement due to insufficiency of the synchronization control pressure Ps1, for example.

When the shift lever 85 is placed from the neutral position N to the forward drive position D and the second clutch C2 is switched to the engaged state, namely, when the accumulator filling operation and the C2 engaging operation are executed in an overlapped manner, there is a concern of occurrence of the synchronized engagement failure such as clutch disengagement due to insufficiency of the synchronization control pressure Ps1, for example.

When the dog clutch D1 and the first brake B1 are both switched to the engaged states, namely, when the synchronized engaging operation and the B1 engaging operation are executed in an overlapped manner, there is a concern of generation of gear noise in the synchronized engaging operation, for example. Since the reverse-driving first drive-force transmitting path is established by engagements of the dog clutch D1 and the first brake B1, there is a concern of generation of gear noise if the synchronized engaging operation is executed with the first brake B1 being in the engaged state during running of the vehicle 10. The generation of gear noise in case of overlapped executions of the synchronized engaging operation and the B1 engaging operation is substantially the same phenomenon as the generation of gear noise by execution of the synchronized engaging operation with the first brake B1 being in the engaged state.

When the first brake B1 is switched to the engaged state with the "belt return" being not yet made in the continuously-variable transmission mechanism 24, namely, when the stepless shifting operation and the B1 engaging operation are executed in an overlapped manner, there is a concern of occurrence of the synchronized engagement failure such as clutch disengagement due to insufficiency of the synchronization control pressure Ps1, for example.

In the present embodiment, in the working-fluid insufficient region in which the rate of supply of the working fluid is likely to be insufficient, a plurality of hydraulic operations, each requiring consumption of the working fluid, are executed in accordance with an order of priority that may be dependent on a running mode. In a case in which the rate of supply of the working fluid is likely to be insufficient, the transmission shifting control portion 104 executes the hydraulic operations, each requiring consumption of the working fluid, in accordance with the predetermined order of priority, thereby making it possible to avoid or restrain the phenomenon that could happen when two or more hydraulic operations are executed in an overlapped manner.

For achieving function of avoiding or restraining the phenomenon that could happen when two or more hydraulic operations are executed in an overlapped manner, the electronic control apparatus 100 further includes a state determining portion means or portion in the form of a state determining portion 106 and an operation-priority-order storage means or portion in the form of a operation-priority-order storage portion 108.

The state determining portion 106 makes a determination as to whether the rate of supply of the working fluid will be insufficient if at least two of the accumulator filling operation, C1 engaging operation, C2 engaging operation, synchronized engaging operation, B1 engaging operation, LU engaging operation and stepless shifting operation are executed in an overlapped manner. The accumulator filling operation, C1 engaging operation, C2 engaging operation, synchronized engaging operation, B1 engaging operation, LU engaging operation and stepless shifting operation are hydraulic operations each of which causes consumption of the working fluid in the hydraulic control unit 46. The state determining portion 106 makes the above determination, depending on whether the engine rotational speed Ne is not higher than a predetermined speed value and the working fluid temperature THoil is not lower than a predetermined temperature degree. The predetermined speed value and the predetermined temperature degree are predetermined thresholds that cooperate with each other to define the working-fluid insufficient region in which the rate of supply of the working fluid is likely to be insufficient if two or more of the above-described hydraulic operations are executed in an overlapped manner, namely, predetermined thresholds for determining whether a current condition (that is defined by a combination of current values the engine rotational speed Ne and the working fluid temperature THoil) lies in the working-fluid insufficient region or not.

The state determining portion 106 determines whether or not the shift lever 85 is placed in the forward drive position D with the gear running mode being selected. Further, the state determining portion 106 determines whether or not the shift lever 85 is placed in the forward drive position D with the belt running mode being selected. Still further, the state determining portion 106 determines whether or not the shift lever 85 is placed in the reverse position R, namely, whether or not the vehicle 10 is to run in a reverse direction. That is, the state determining portion 106 determines whether or not a running with the shift lever 85 being placed in the reverse position R is selected. The state determining portion 106 determines whether or not the gear running mode is selected, based on the switching of the running mode made by the transmission shifting control portion 104 using the stepped shifting map. Further, the state determining portion 106 determines whether or not the belt running mode is selected, based on the switching of the running mode made by the transmission shifting control portion 104 using the stepped shifting map.

The operation-priority-order storage portion 108 stores therein a predetermined operation priority order, i.e., the order of priority that is dependent on a running mode. There will be described the operation priority order, which is to be set to a priority order pattern that is dependent on case by case.

When the shift lever 85 is placed to the forward drive position D from another operation position that is other than the forward drive position D, the mechanical valve 86 is switched to a state in which the drive pressure PD (=modulator pressure PM) is supplied as a source pressure to each of the C1 solenoid valve SL1 and the C2 solenoid valve SL2. In this instance, if the accumulator 98 is not yet fully filled, the accumulator filling operation is executed. In the above-described working-fluid insufficient region, i.e., in a region in which the engine rotational speed Ne is not higher than the predetermined speed value and the working fluid temperature THoil is not lower than the predetermined temperature degree, there is a concern that the modulator pressure PM could be reduced by execution of the accumulator filling operation. The drive pressure PD could be affected by the accumulator filling operation, and the reverse pressure PR is not affected by the accumulator filling operation. The accumulator filling operation is an operation executed automatically as a consequence of the switching operation of the shift lever 85 to the forward drive position D. Therefore, when the shift lever 85 is placed in the forward drive position D, the operation priority order is set such that the highest priority is given to execution of the accumulator filling operation. Whether the accumulator filling operation has been completed or not, namely, whether filling of the accumulator 98 with the working fluid has been completed or not, is determined by the state determining portion 106, for example, depending on whether or not a predetermined time A has passed since the shift lever 85 had been operated to the forward drive position D. The predetermined time A corresponds to a length of time, which is required to complete filling of the accumulator 98 by input of the drive pressure PD to the accumulator 98, from an unfilled state of the accumulator 98.

In the above-described working-fluid insufficient region, if the accumulator filling operation and the stepless shifting operation such as a shift-down action to make the "belt return" are executed in an overlapped manner, there is a concern of occurrence of a synchronized engagement failure such as clutch disengagement and gear noise generation in the synchronized engaging operation. Therefore, a higher priority is given to operations for engaging the dog clutch D1 and holding the engaged state of the dog clutch D1, rather than to the stepless shifting operation, from the point of view of prioritization given to switching to the gear running mode. To this end, when the shift lever 85 is placed in the forward drive position D, the operation priority order is set such that, after the accumulator 98 has been fully filled, the synchronized engaging operation and the stepless shifting operation are executed in this order.

The engagement of the dog clutch D1 is indispensable for enabling the vehicle 10 to run in the gear running mode. When the first drive-force transmitting path PT1 is to be established, it is preferable that the C1 engaging operation or the B1 engaging operation is executed while the dog clutch D1 is in the engaged state. Further, when the shift lever 85 is placed in the reverse position R, the modulator pressure PM is supplied as synchronization control pressure Ps1 to the hydraulic actuator 57 through the S1B1 control valve 96. That is, the synchronized engaging operation, which is executed together with execution of the B1 engaging operation for establishing the reverse-driving first drive-force transmitting path, is an operation executed automatically in response to execution of the switching operation by which the shift lever 85 is placed in the reverse position R. On the other hand, the engagement of the dog clutch D1 is not required for enabling the vehicle 10 to run in the belt running mode. Placing the dog clutch D1 in the engaged state during the running in the belt running mode is a pre-operation that is executed for preparing a stepped shift-down action from the belt running mode to the gear running mode. Thus, when the C2 engaging operation and the synchronized engaging operation are required to be executed, the operation priority order is set such that a higher priority is given to execution of the C2 engaging operation than to execution of the synchronized engaging operation. When the C1 engaging operation and the synchronized engaging operation are required to be executed, the operation priority order is set such that a higher priority is given to execution of the synchronized engaging operation than to execution of the C1 engaging operation. When the B1 engaging operation and the synchronized engaging operation are required to be executed, the operation priority order is set such that a higher priority is given to execution of the synchronized engaging operation than to execution of the B1 engaging operation. Whether the synchronized engaging operation has been completed or not upon the reverse running is determined by the state determining portion 106, for example, depending on whether or not a predetermined time B has passed since the shift lever 85 had been operated to the reverse position R. The predetermined time B corresponds to a length of time, which is required to place the dog clutch D1 into the engaged state by input of the modulator pressure PM to the hydraulic actuator 57.

In the above-described working-fluid insufficient region, if the stepless shifting operation is executed in an overlapped manner during execution of the C1 engaging operation, C2 engaging operation or B1 engaging operation, the belt torque capacity Tcvt required for the primary input torque Tpri could be insufficient due to reduction of the modulator pressure PM, so that there is a concern that a belt slippage could occur. From the point of view of prioritization given to establishment of a drive-force transmitting path through which the drive force is to be transmitted, a higher priority is given to the engagement of the first clutch C1, engagement of the second clutch C2 or engagement of the first brake B1, than to the execution of the stepless shifting operation. Therefore, when the C1 engaging operation and the stepless shifting operation are required to be executed, the operation priority order is set such that a higher priority is given to execution of the C1 engaging operation than to execution of the stepless shifting operation. When the C2 engaging operation and the stepless shifting operation are required to be executed, the operation priority order is set such that a higher priority is given to execution of the C2 engaging operation than to execution of the stepless shifting operation. When the B1 engaging operation and the stepless shifting operation are required to be executed, the operation priority order is set such that a higher priority is given to execution of the B1 engaging operation than to execution of the stepless shifting operation.

In the above-described working-fluid insufficient region, a lower priority is given to execution of the LU engaging operation, because the engagement of the lock-up clutch LU is to be made, for example, for the purpose of improving the fuel economy and improving a so-called "direct feeling" in transmission of the drivee force. Further, by placing in the lock-up clutch LU in the released state, it is possible to restrain consumption of the working fluid in the hydraulic control unit 46. From this point of view, a higher priority is given to execution of the shifting operation of the continuously-variable transmission mechanism 24 than to the engagement of the lock-up clutch LU. Thus, the operation priority order is set such that a higher priority is given to execution of the stepless shifting operation than to execution of the LU engaging operation.

When the shift lever 85 is placed in the forward drive position D with the gear running mode being selected, the operation priority order is set to a priority order pattern A defining that, after the accumulator 98 has been fully filled, the synchronized engaging operation, C1 engaging operation, stepless shifting operation and LU engaging operation are executed sequentially in this order. That is, in the priority order pattern A, the priority given to each hydraulic operation is represented by "accumulator filling operation>synchronized engaging operation>C1 engaging operation>stepless shifting operation>LU engaging operation". A hydraulic operation having a higher priority is executed prior to execution of another hydraulic operation having a lower priority.

Further, when the shift lever 85 is placed in the forward drive position D with the belt running mode being selected, the operation priority order is set to a priority order pattern B defining that, after the accumulator 98 has been fully filled, the C2 engaging operation, synchronized engaging operation, stepless shifting operation and LU engaging operation are executed sequentially in this order. That is, in the priority order pattern B, the priority given to each hydraulic operation is represented by "accumulator filling operation>C2 engaging operation>synchronized engaging operation>stepless shifting operation>LU engaging operation".

Further, when the shift lever 85 is placed in the reverse position R for reverse running of the vehicle, the operation priority order is set to a priority order pattern C defining that the synchronized engaging operation, B1 engaging operation and stepless shifting operation are executed sequentially in this order. That is, in the priority order pattern C, the priority given to each hydraulic operation is represented by "synchronized engaging operation>B1 engaging operation>stepless shifting operation".

When it is determined by the state determining portion 106 that the rate of supply of the working fluid will be insufficient if at least two of the hydraulic operations (each requiring consumption of the working fluid) are executed in in an overlapped manner, the transmission shifting control portion 104 executes required ones of the hydraulic operations in accordance with the operation priority order stored in the operation-priority-order storage portion 108. The plurality of hydraulic operations include: an operation for causing a stepped shift-up action or a stepped shift-down action executed for establishing the running mode that is determined with use of the stepped shifting map; an operation for causing a shifting action to be executed for establishing the target gear ratio γcvttgt calculated with use of the CVT shifting map; an operation for establishing the forward-driving first drive-force transmitting path; an operation for establishing the reverse-driving first drive-force transmitting path; an operation for establishing the second drive-force transmitting path PT2; and an operation for engaging the lock-up clutch LU in accordance with determination made with use of a lockup region map.

FIG. 3 is a flow chart showing a main part of a control routine executed by the electronic control apparatus 100, namely, a control routine that is executed for reducing failures that affect running of the vehicle, when a rate of supply of a working fluid is to be insufficient. This control routine is executed in a repeated manner, for example.

As shown in FIG. 3, the control routine is initiated with step S10 corresponding to function of the state determining portion 106, which is implemented to determine whether or not the rate of supply of the working fluid will be insufficient if at least of the hydraulic operations (each requiring consumption of the working fluid) are executed in an overlapped manner. This determination is made based on the engine rotational speed Ne and the working fluid temperature THoil. Specifically, it is determined at step S10 that the rate of supply of the working fluid will be insufficient, when the engine rotational speed Ne is not higher than a predetermined speed value and the working fluid temperature THoil is not lower than a predetermined temperature degree. When a negative determination is made at step S10, one cycle of execution of the control routine is terminated. When an affirmative determination is made at step S10, step S20 corresponding to function of the state determining portion 106 is implemented to determine whether or not the shift lever 85 is in the forward drive position D with the gear running mode is being selected. When a negative determination is made at step S20, the control flow goes to step S30 corresponding to function of the state determining portion 106, which is implemented to determine whether or not the shift lever 85 is in the forward drive position D with the belt running mode is being selected. When a negative determination is made at step S30, the control flow goes to step S40 corresponding to function of the state determining portion 106, which is implemented to determine whether or not the shift lever 85 is in the reverse position R. When a negative determination is made at step S40, one cycle of execution of the control routine is terminated. When an affirmative determination is made at S20, step S50 corresponding to function of the transmission shifting control portion 104 is implemented to execute required hydraulic operations in accordance with the priority order pattern A which is stored in the operation-priority-order storage portion 108 and which is for running with the forward drive position D in the gear running mode. When an affirmative determination is made at S30, step S60 corresponding to function of the transmission shifting control portion 104 is implemented to execute required hydraulic operations in accordance with the priority order pattern B which is stored in the operation-priority-order storage portion 108 and which is for running with the forward drive position D in the belt running mode. When an affirmative determination is made at S40, step S70 corresponding to function of the transmission shifting control portion 104 is implemented to execute required hydraulic operations in accordance with the priority order pattern C which is stored in the operation-priority-order storage portion 108 and which is for running with the reverse position R.

As described above, in the present embodiment, when the rate of supply of the working fluid to the hydraulic control unit 46 is to be insufficient relative to the rate of consumption of the working fluid in the hydraulic control unit 46 if at least two of the plurality of hydraulic operations (including the accumulator filling operation, the C1 engaging operation, the C2 engaging operation, the synchronized engaging operation, the B1 engaging operation, the LU engaging operation and the stepless shifting operation) are executed in an overlapped manner, required ones of the plurality of hydraulic operations are executed in accordance with the operation priority order that is dependent on the selected one of first and belt running modes, so that it is possible to restrain occurrence of a failure due to insufficiency of the rate of supply of the working fluid. Therefore, when the rate of supply of the working fluid to the hydraulic control unit 46 is to be insufficient relative to the rate of consumption of the working fluid in the hydraulic control unit 46, it is possible to reduce the failure that could affect running of the vehicle.

In the present embodiment, when the C2 engaging operation and the synchronized engaging operation are to be executed as the required ones of the plurality of hydraulic operations, the operation priority order is set to a priority order pattern by which a higher priority is given to execution of the C2 engaging operation than to execution of the synchronized engaging operation, so that it is possible to appropriately perform a running of the vehicle 10 in the belt running mode in which the engagement of the dog clutch D1 is not required. Further, when the C1 engaging operation and synchronized engaging operation are to be executed as the required ones of the plurality of hydraulic operations, the operation priority order is set to a priority order pattern by which a higher priority is given to execution of the synchronized engaging operation than to execution of the C1 engaging operation, so that it is possible to appropriately perform a running of the vehicle in the gear running mode in which the engagement of the dog clutch D1 is required. Further, the running mode can be appropriately switched from the belt running mode to the first running mod, by releasing and engaging the second clutch C2 and the first clutch C1, respectively, while the dog clutch D1 is in the engaged state.

In the present embodiment, when the C1 engaging operation and the stepless shifting operation are to be executed as the required ones of the plurality of hydraulic operations, the operation priority order is set to a priority order pattern by which a higher priority is given to execution of the C1 engaging operation than to execution of the stepless shifting operation, and when the C2 engaging operation and the stepless shifting operation are to be executed as the required ones of the plurality of hydraulic operations, the operation priority order is set to a priority order pattern by which a higher priority is given to execution of the C2 engaging operation than to execution of the stepless shifting operation. Therefore, it is possible to prevent occurrence of a belt slippage due to insufficiency of the rate of supply of the working fluid, and to prioritize establishment of the drive-force transmitting path, i.e., transmission of the drive force of the engine 12, rather than execution of a shifting action of the continuously-variable transmission mechanism 24.

In the present embodiment, when the accumulator filling operation and at least one of the plurality of hydraulic operations, which is other than the accumulator filling operation, are to be executed as the required ones of the plurality of hydraulic operations, with the shift lever 85 being placed in the forward-drive operation position D, the operation priority order is set to a priority order pattern by which a higher priority is given to execution of the accumulator filling operation than to execution of any one of the at least one of the plurality of hydraulic operations, so that a hydraulic operation or operations relating to a forward running of the vehicle 10 can be appropriately executed after the accumulator 98 has been fully charged. Therefore, it is possible to prevent insufficiency of the rate of supply of the working fluid, which could be caused if the hydraulic operation or operations relating to the forward running are executed during the accumulator filling operation that is executed in response to the placement of the shift lever 85 into the forward-drive operation position D.

In the present embodiment, when the synchronized engaging operation and the stepless shifting operation in addition to the accumulator filling operation are to be executed as the required ones of the plurality of hydraulic operations, with the shift lever 85 being placed in the forward-drive operation position D, the synchronized engaging operation and then the stepless shifting operation are executed after execution of the accumulator filling operation has been completed, in accordance with the priority order pattern, so that it is possible to prevent insufficiency of the rate of supply of the working fluid, which could be caused if the stepless shifting operation is executed during the accumulator filling operation that is executed in response to the placement of the shift lever 85 into the forward-drive operation position D. Thus, it is possible to avoid insufficiency of the rate of supply of the working fluid and accordingly prevent failure such as clutch disengagement. Further, it is possible to appropriately perform engagement of the dog clutch D1, which is required upon switching between the gear running mode and the belt running mode.

In the present embodiment, when the C1 engaging operation in addition to the accumulator filling operation, the synchronized engaging operation and the stepless shifting operation is to be executed as one of the required ones of the plurality of hydraulic operations, with the shift lever 85 being placed in the forward-drive operation position D, and with the gear running mode being selected, the synchronized engaging operation, the C1 engaging operation and the stepless shifting operation are executed in this order after execution of the accumulator filling operation has been completed, in accordance with the priority order pattern, so that it is possible to appropriately perform a forward running of the vehicle 10 in the gear running mode.

In the present embodiment, when the C2 engaging operation in addition to the accumulator filling operation, the synchronized engaging operation and the stepless shifting operation is to be executed as one of the required ones of the plurality of hydraulic operations, with the shift lever 85 being placed in the forward-drive operation position D, and with the belt running mode being selected, the C2 engaging operation, the synchronized engaging operation and the stepless shifting operation are executed in this order after execution of the accumulator filling operation has been completed, in accordance with the priority order pattern, so that it is possible to appropriately perform a forward running of the vehicle 10 in the belt running mode.

In the present embodiment, when the synchronized engaging operation, the B1 engaging operation and the stepless shifting operation are to be executed as the required ones of the plurality of hydraulic operations, for running of the vehicle 10 in the reverse direction, the operation priority order is set to a priority order pattern by which a priority is given to execution of each of these hydraulic operations such that the synchronized engaging operation, the B1 engaging operation and the stepless shifting operation are executed in this order, so that it is possible to appropriately perform a reverse running of the vehicle 10 in the gear running mode.

In the present embodiment, when the stepless shifting operation and the LU engaging operation are to be executed as the required ones of the plurality of hydraulic operations, the operation priority order is set to a priority order pattern by which a higher priority is given to execution of the stepless shifting operation than to execution of the LU engaging operation, so that a higher priority is given to the execution of a shifting action of the continuously-variable transmission mechanism 24 than to the engagement of the lock-up clutch LU which is to be made, for example, for the purpose of reducing an energy consumption and improving a so-called "direct feeling" in transmission of the drivee force.

While the preferred embodiment of this invention has been described in detail by reference to the drawings, it is to be understood that the invention may be otherwise embodied.

For example, in the above-described embodiment, the plurality of hydraulic operations, each of which causes consumption of the working fluid in the hydraulic control unit 46, are the accumulator filling operation, the C1 engaging operation, the C2 engaging operation, the synchronized engaging operation, the B1 engaging operation, the LU engaging operation and the stepless shifting operation. However, from a point of view of application of the present invention also to a case in which the vehicle 10 is not provided with the accumulator 98 and the lock-up clutch LU, the hydraulic operations may be the C1 engaging operation, the C2 engaging operation, the synchronized engaging operation, the B1 engaging operation and the stepless shifting operation. Further, from a point of view of application of the present invention to a stage upon a forward running of the vehicle 10, the hydraulic operations may be the C1 engaging operation, the C2 engaging operation, the synchronized engaging operation and the stepless shifting operation. Where the invention is carried out upon the forward running, when the rate of supply of the working fluid to the hydraulic control unit 46 will be insufficient if at least two of the C1 engaging operation, C2 engaging operation, synchronized engaging operation and stepless shifting operation are executed in an overlapped manner, the transmission shifting control portion 104 executes required hydraulic operations in accordance with the operation priority order that is dependent on the running mode. In this case, the operation priority order is set to a priority order pattern by which a priority is given to each of the C1 engaging operation, C2 engaging operation, synchronized engaging operation and stepless shifting operation. Moreover, the present invention is applicable also to a case in which the vehicle 10 is not provided with the accumulator 98 and/or the lock-up clutch LU.

Further, in the present embodiment, the determination as to whether the rate of supply of the working fluid will be insufficient or not is made depending on whether the engine rotation speed Ne is not higher than the predetermined speed value and the working fluid temperature THoil is not lower than the predetermined temperature degree. However, for example, this determination may be made depending on whether the engine rotation speed Ne is not higher than the predetermined speed value, or may be made depending on whether the working fluid temperature THoil is not lower than the predetermined temperature degree. Moreover, the predetermined speed value may be either a constant speed value or a variable speed value that varies depending on the working fluid temperature THoil. Where the predetermined speed value is the variable speed value, the predetermine speed value is increased with increase of the working fluid temperature THoil.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and/or a gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Moreover, from the point of view of application of the present invention also to the case in which the vehicle 10 is not provided with the lock-up clutch LU, the fluid-operated drive-force transmitting device does not have to be necessarily provided in the vehicle 10. It is noted that the lock-up clutch LU may be also a lock-up clutch that is be engaged with a friction plate, which is to be pressed by a piston.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
44: oil pump
46: hydraulic control unit
60: primary pulley
60c: hydraulic actuator
64: secondary pulley
66: transmission belt (transfer element)
85: shift lever (shifting member)
86: mechanical valve
98: accumulator
99: drive pressure fluid passage (though which forward hydraulic pressure is to flow)
100: electronic control apparatus (control apparatus)
104: transmission shifting control portion
C1: first clutch (first friction engagement device)
C2: second clutch (second friction engagement device)
B1: first brake (third friction engagement device)
D1: dog clutch
LU: lock-up clutch
PT1: first drive-force transmitting path
PT2: second drive-force transmitting path
SL1: C1 solenoid valve (first solenoid valve)
SL2: C2 solenoid valve (second solenoid valve)
SLG: D1 solenoid valve (third solenoid valve)
SLP: primary solenoid valve (fourth solenoid valve)
SLS: secondary solenoid valve (fifth solenoid valve)
SLU: LU solenoid valve (sixth solenoid valve)

What is claimed is:

1. A control apparatus for a vehicle that includes a drive force source, drive wheels, a drive-force transmitting apparatus, a hydraulic control unit and a pump, wherein the drive-force transmitting apparatus includes:
   an input rotary member to which a drive force is to be transmitted from the drive force source;
   an output rotary member from which the drive force is to be outputted to the drive wheels;
   a gear mechanism configured to provide at least one gear ratio;
   a continuously-variable transmission mechanism including a primary pulley, a secondary pulley and a transfer element looped over the primary and secondary pulleys;
   a first friction engagement device;
   a second friction engagement device; and
   a dog clutch,
   wherein the drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism when the first drive-force transmitting path is established by engagements of the first friction engagement device and the dog clutch, wherein the plurality of drive-force transmitting paths include a second drive-force transmitting path through which the drive force is to be transmitted by the continuously-variable transmission mechanism when the second drive-force transmitting path is established by engagement of the second friction engagement device, wherein the hydraulic control unit includes a plurality of solenoid valves configured to output respective hydraulic pressures by using a working fluid that is supplied to the hydraulic control unit, wherein the plurality of solenoid valves include: a first solenoid valve configured to regulate a first hydraulic pressure by which the first friction engagement device is to be operated; a second solenoid valve configured to regulate a second hydraulic pressure by which the second friction engagement device is to be operated; a third solenoid valve configured to regulate a third hydraulic pressure by which the dog clutch is to be operated; a fourth solenoid valve configured to regulate a fourth hydraulic pressure by which the primary pulley is to be operated; and a fifth solenoid valve configured to regulate a fifth hydraulic pressure by which the secondary pulley is to be operated, wherein the pump is configured to supply the working fluid to the hydraulic control unit, wherein the vehicle is to run with a selected one of first and second running modes being established, such that the vehicle runs by the drive force transmitted through the first drive-force transmitting path when the first running mode is established, and such that the vehicle runs by the drive force transmitted through the second drive-force transmitting path when the second running mode is established, wherein said control apparatus comprises a transmission shifting control portion that is configured, when a rate of supply of the working fluid to the hydraulic control unit is to be insufficient relative to a rate of consumption of the working fluid in the hydraulic control unit if at least two of a plurality of hydraulic operations are executed in an overlapped manner, to execute required ones of the plurality of hydraulic operations in accordance with an order of priority, and wherein the plurality of hydraulic operations include: a first engaging operation that is executed to switch the first friction engagement device from a released state to an engaged state; a second engaging operation that is executed to switch the second friction engagement device from a released state to an engaged state; a third engaging operation that is executed to switch the dog clutch from a released state to an engaged state; and a stepless shifting operation that is executed to operate at least one of the first and second pulleys.

2. The control apparatus according to claim 1,
wherein, when the second and third engaging operations are to be executed as the required ones of the plurality of hydraulic operations, said transmission shifting control portion is configured to set the order of priority to a priority order pattern by which a higher priority is given to execution of the second engaging operation than to execution of the third engaging operation, and wherein, when the first and third engaging operations are to be executed as the required ones of the plurality of hydraulic operations, said transmission shifting control portion is configured to set the order of priority to a priority order pattern by which a higher priority is given to execution of the third engaging operation than to execution of the first engaging operation.

3. The control apparatus according to claim 1,
wherein, when the first engaging operation and the stepless shifting operation are to be executed as the required ones of the plurality of hydraulic operations, said transmission shifting control portion is configured to set the order of priority to a priority order pattern by which a higher priority is given to execution of the first engaging operation than to execution of the stepless shifting operation, and wherein, when the second engaging operation and the stepless shifting operation are to be executed as the required ones of the plurality of hydraulic operations, said transmission shifting control portion is configured to set the order of priority to a priority order pattern by which a higher priority is given to execution of the second engaging operation than to execution of the stepless shifting operation.

4. The control apparatus according to claim 1,
wherein the hydraulic control unit further includes a switching valve that is configured to switch a fluid passage defined in the switching valve, in association with a switching operation made through a shifting member by an operator of the vehicle, such that a forward hydraulic pressure is outputted from the switching valve when the shifting member is placed into a forward-drive operation position, wherein the hydraulic control unit further includes an accumulator that is connected to a fluid passage through which the forward hydraulic pressure outputted from the switching valve is to flow, wherein the plurality of hydraulic operations further include an accumulator filling operation that is executed to fill the accumulator, and wherein, when the accumulator filling operation and at least one of the plurality of hydraulic operations, which is other than the accumulator filling operation, are to be executed as the required ones of the plurality of hydraulic operations, with the shifting member being placed in the forward-drive operation position, said transmission shifting control portion is configured to set the order of priority to a priority order pattern by which a higher priority is given to execution of the accumulator filling operation than to execution of any one of said at least one of the plurality of hydraulic operations.

5. The control apparatus according to claim 4, wherein, when the third engaging operation and the stepless shifting operation in addition to the accumulator filling operation are to be executed as the required ones of the plurality of hydraulic operations, with the shifting member being placed in the forward-drive operation position, said transmission shifting control portion is configured, after execution of the accumulator filling operation has been completed, to execute the third engaging operation and then the stepless shifting operation in accordance with the priority order pattern.

6. The control apparatus according to claim 5, wherein, when the first engaging operation in addition to the accumulator filling operation, the third engaging operation and the stepless shifting operation is to be executed as one of the required ones of the plurality of hydraulic operations, with the shifting member being placed in the forward-drive operation position, and with the first running mode being selected, said transmission shifting control portion is configured, after execution of the accumulator filling operation has been completed, to execute the first engaging operation, the third engaging operation and the stepless shifting operation in accordance with the priority order pattern, such that the third engaging operation, the first engaging operation and the stepless shifting operation are executed in this order.

7. The control apparatus according to claim 5, wherein, when the second engaging operation in addition to the accumulator filling operation, the third engaging operation and the stepless shifting operation is to be executed as one of the required ones of the plurality of hydraulic operations, with the shifting member being placed in the forward-drive operation position, and with the second running mode being selected, said transmission shifting control portion is configured, after execution of the accumulator filling operation has been completed, to execute the second engaging operation, the third engaging operation and the stepless shifting operation in accordance with the priority order pattern, such that the second engaging operation, the third engaging operation and the stepless shifting operation are executed in this order.

8. The control apparatus according to claim 1,
wherein the drive-force transmitting apparatus further includes a third friction engagement device,
wherein the first drive-force transmitting path is to be established by engagements of the third friction engagement device and the dog clutch as well as by the engagements of the first friction engagement device and the dog clutch, such that the first drive-force transmitting path serves as a forward-driving first drive-force transmitting path for enabling the vehicle to run in a forward direction when being established by the engagements of the first friction engagement device and the dog clutch, and such that the first drive-force transmitting path serves as a reverse-driving first drive-force transmitting path for enabling the vehicle to run in a reverse direction when being established by the engagements of the third friction engagement device and the dog clutch,
wherein the third solenoid valve is configured, upon running of the vehicle in the reverse direction, to regulate a sixth hydraulic pressure by which the third friction engagement device is to be operated,
wherein, upon running of the vehicle in the reverse direction, the dog clutch is to be engaged with a source pressure, which is inputted to each of the fourth and fifth solenoid valves, being supplied to the dog clutch,
wherein the plurality of hydraulic operations include, in addition to the first through third engaging operations and the stepless shifting operation, a fourth engaging operation that is executed to switch the third friction engagement device from a released state to an engaged state, and
wherein, when the third and fourth engaging operations and the stepless shifting operation are to be executed as the required ones of the plurality of hydraulic operations, for running of the vehicle in the reverse direction, said transmission shifting control portion is configured to set the order of priority to a priority order pattern by which a priority is given to execution of each of the third and fourth engaging operations and the stepless shifting operation such that the third engaging operation, the fourth engaging operation and the stepless shifting operation are executed in this order.

9. The control apparatus according to claim 1,
wherein the drive-force transmitting apparatus includes a fluid transmission device configured to transmit the drive force of the drive force source to the input rotary member,
wherein the fluid transmission device includes a lockup clutch operable to directly connect between the drive force source and the input rotary member,
wherein the plurality of solenoid valves further include a sixth solenoid valve configured to regulate a seventh hydraulic pressure by which the lockup clutch is to be operated,
wherein the plurality of hydraulic operations include, in addition to the first through third engaging operations and the stepless shifting operation, a fifth engaging operation that is executed to switch the lockup clutch from a releases released state to an engaged state, and
wherein, when the stepless shifting operation and the fifth engaging operation are to be executed as the required ones of the plurality of hydraulic operations, said transmission shifting control portion is configured to set the order of priority to a priority order pattern by which a higher priority is given to execution of the stepless shifting operation than to execution of the fifth engaging operation.

10. The control apparatus according to claim 1, wherein the order of priority is dependent on the selected one of first and second running modes.

11. The control apparatus according to claim 1, further comprising a state determining portion that is configured to determine whether the rate of supply of the working fluid to the hydraulic control unit is to be insufficient relative to the rate of consumption of the working fluid in the hydraulic control unit if at least two of the plurality of hydraulic operations are executed in the overlapped manner,
wherein the pump is to be driven by rotation of the drive force source, and
wherein said state determining portion is configured to determine that the rate of supply of the working fluid to the hydraulic control unit is to be insufficient relative to the rate of consumption of the working fluid in the hydraulic control unit if at least two of the plurality of hydraulic operations are executed in the overlapped manner, when a speed of the rotation of the drive force source is not higher than a predetermined speed value and/or a temperature of the working fluid is not lower than a predetermined temperature degree.

12. A control apparatus for a vehicle that includes an engine, drive wheels, a drive-force transmitting apparatus, a valve array, and a pump, wherein the drive-force transmitting apparatus includes:
an input shaft to which a drive force is to be transmitted from the engine;
an output shaft from which the drive force is to be outputted to the drive wheels;
a gear mechanism configured to provide at least one gear ratio;
a continuously-variable transmission mechanism including a primary pulley, a secondary pulley and a transmission belt looped over the primary and secondary pulleys;
a first clutch;
a second clutch; and
a dog clutch,
wherein the drive-force transmitting apparatus defines a plurality of drive-force transmitting paths that are provided in parallel with each other between the input shaft and the output shaft, wherein the plurality of drive-force transmitting paths include a first drive-force transmitting path through which the drive force is to be transmitted by the gear mechanism when the first drive-force transmitting path is established by engagements of the first clutch and the dog clutch, wherein the plurality of drive-force transmitting paths include a second drive-force transmitting path through which the drive force is to be transmitted by the continuously-variable transmission mechanism when the second drive-force transmitting path is established by engagement of the second clutch, wherein the valve array includes a plurality of solenoid valves configured to output respective hydraulic pressures by using a working fluid that is supplied to the valve array, wherein the plurality of solenoid valves include: a first solenoid valve configured to regulate a first hydraulic pressure by which the first clutch is to be operated; a second solenoid valve configured to regulate a second hydraulic pressure by which the second clutch is to be operated; a third solenoid valve configured to regulate a third hydraulic pressure by which the dog clutch is to be operated; a fourth solenoid valve configured to regulate a fourth hydraulic pressure by which the primary pulley is to be operated; and a fifth solenoid valve configured to regulate a fifth hydraulic pressure by which the secondary pulley is to be operated, wherein the pump is configured to supply the working fluid to the valve array, wherein the vehicle is to run with a selected one of first and second running modes being established, such that the vehicle runs by the drive force transmitted through the first drive-force transmitting path when the first running mode is established, and such that the vehicle runs by the drive force transmitted through the second drive-force transmitting path when the second running mode is established, wherein said control apparatus comprises a transmission shifting control portion that is configured, when a rate of supply of the working fluid to the valve array is to be insufficient relative to a rate of consumption of the working fluid in the valve array if at least two of a plurality of hydraulic operations are executed in an overlapped manner, to execute required ones of the plurality of hydraulic operations in accordance with an order of priority, and wherein the plurality of hydraulic operations include: a first engaging operation that is executed to switch the first clutch from a released state to an engaged state; a second engaging operation that is executed to switch the second clutch from a released state to an engaged state; a third engaging operation that is executed to switch the dog clutch from a released state to an engaged state; and a stepless shifting operation that is executed to operate at least one of the first and second pulleys.

* * * * *